(12) United States Patent
Mundoor et al.

(10) Patent No.: US 12,428,605 B2
(45) Date of Patent: Sep. 30, 2025

(54) COMPOSITE CONDENSED MATTER MATERIAL AND METHODS OF USING AND FORMING SAME

(71) Applicant: The Regents of the University of Colorado, a body corporate, Denver, CO (US)

(72) Inventors: Haridas Mundoor, Boulder, CO (US); Ivan I. Smalyukh, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 0 days.

(21) Appl. No.: 17/548,388

(22) Filed: Dec. 10, 2021

(65) Prior Publication Data

US 2022/0186120 A1    Jun. 16, 2022

Related U.S. Application Data

(60) Provisional application No. 63/123,907, filed on Dec. 10, 2020.

(51) Int. Cl.
  *G02F 1/1333*    (2006.01)
  *C09K 19/52*     (2006.01)

(52) U.S. Cl.
  CPC ........ *C09K 19/52* (2013.01); *C09K 2019/521* (2013.01)

(58) Field of Classification Search
  CPC .. C09K 19/52; C09K 19/54; C09K 2019/521; C09K 2019/523
  See application file for complete search history.

(56) References Cited

U.S. PATENT DOCUMENTS

| | | | |
|---|---|---|---|
| 8,999,195 B2 * | 4/2015 | Chu | C09K 19/582 252/299.5 |
| 2022/0186120 A1 * | 6/2022 | Mundoor | C09K 19/52 |

\* cited by examiner

*Primary Examiner* — Geraldina Visconti
(74) *Attorney, Agent, or Firm* — Snell & Wilmer L.L.P.

(57) ABSTRACT

Composite condensed matter material, devices including the composite condensed matter material, and methods of forming and using the composite condensed matter material are disclosed. The composite condensed matter material includes a host material and particles dispersed and suspended within the host material. The composite condensed matter material can exhibit one or more low symmetry phases and reconfigurable properties.

20 Claims, 15 Drawing Sheets
(13 of 15 Drawing Sheet(s) Filed in Color)

COMPOSITE CONDENSED MATTER MATERIAL AND METHODS OF USING AND FORMING SAME

CROSS-REFERENCE TO RELATED APPLICATION

This application claims priority to U.S. Provisional Application No. 63/123,907, filed Dec. 10, 2020, and entitled "COMPOSITE CONDENSED MATTER MATERIAL AND METHODS OF USING AND FORMING SAME," the disclosure of which is hereby incorporated by reference in its entirety.

FEDERALLY-SPONSORED RESEARCH

This invention was made with government support under grant number DE-SC0019293 awarded by the U.S. Department of Energy. The government has certain rights in the invention.

FIELD OF THE DISCLOSURE

The present disclosure generally relates to composite condensed matter material. More particularly, examples of the disclosure relate to composite condensed matter material, including a liquid crystal host material and particles dispersed within the host material, which exhibits low symmetry phases and reconfigurable properties.

BACKGROUND OF THE DISCLOSURE

Composite condensed matter material, such as liquid crystals, can be used in a variety of applications, such as displays, sensors, and biodetectors.

Deep relations are believed to exist between symmetries of building blocks and condensed matter (e.g. liquid crystal) phases they form. For example, constituent molecular rods and discs impart their uniaxial symmetry on nematic liquid crystals, like the ones used in displays. Low-symmetry organisations could hypothetically form in mixtures of rods and discs, but entropy tends to phase-separate them at both molecular and colloidal scales.

While colloidal discs have been dispersed in nematic hosts of rod-like molecules and vice versa, the focus has been mainly on individual particles and no new mesophases were reported. Having a structure with few or no symmetry operations apart from trivial so far was thought to be a property of solids alone, and not of their fluid condensed matter counterparts.

Any discussion of problems and solutions set forth in this section has been included in this disclosure solely for the purpose of providing a context for the present disclosure and should not be taken as an admission that any or all of the discussion was known at the time the invention was made.

SUMMARY OF THE DISCLOSURE

This summary is provided to introduce a selection of concepts. This summary is not intended to necessarily identify key features or essential features of the claimed subject matter, nor is it intended to be used to limit the scope of the claimed subject matter.

Various embodiments of the present disclosure relate to composite condensed matter material and to methods of using and forming the composite condensed matter material. As set forth in more detail below, the composite condensed matter material can exhibit low-symmetry (meso)phases, which allow for relatively easy manipulation of one or more properties of the composite condensed matter material.

In accordance with exemplary embodiments of the disclosure, a composite condensed matter material includes a host material tending to form a molecular liquid crystal and particles dispersed and suspended within the host material. In this context, tending for form includes host materials that can form a liquid crystal. The host material can include molecules having a first shape. The particles can have a second shape. The second shape can be the same or different from the first shape. The particles can exhibit different orientations from that of molecules. The particles can be surface functionalized to mitigate aggregation of the particles and to facilitate orientation of the particles different from the orientation of molecules. The composite condensed matter material can exhibit one or more low symmetry phases (e.g., different than the symmetry of either the molecules or the particles). Additionally, the composite condensed matter material can exhibit reconfigurable properties, such as optical, dielectric, magnetic, plasmonic and the like. In accordance with examples of the disclosure, the host material can be or include nematic liquid crystal material. The particles can be formed of a variety of materials, such as one or more of semiconductor, dielectric, magnetic, polymer, or any combination thereof. A volume fraction of the particles within the host material can vary according to application. By way of example, the volume fraction of the particles within the host material can be between about 0.1% and about 1% or about 1% and about 50% percent. A size of the particles can range from about 2 nm to about 10 μm or about 2 nm to about 5 μm. In accordance with examples of these embodiments, the particles have the same charge type. In accordance with further examples, the particles are anisotropic in shape and/or exhibit a magnetic property or electric dipole moments. By way of particular examples, a shape of the particles can be rod like, hexagonal prism, disc, v-shape, u-shape, w-shape, triangular prism, or the like. The particles can be coated with a polymer to stabilize the particles by steric interaction. Exemplary suitable polymers include polyethylene glycol, polystyrene, and the like. The host material can include one or more molecular mesogens, such as 4-cyano-4'-pentylbiphenyl.

In accordance with further embodiments of the disclosure, the composite condensed matter material exhibits one or more of monoclinic, orthorhombic, triclinic biaxial orientational order, or orientational order with any other symmetry different from that of shapes and phases formed by either of the molecules or the particles. For example, both the host material and the particles can exhibit uniaxial symmetry and the composite condensed matter material can exhibit monoclinic nematic, smectic, and columnar states with monoclinic, triclinic, orthorhombic and other symmetries of orientational order that have a lower number of symmetry operations compared to the uniaxial symmetry. The composite condensed matter material can exhibit a plurality of phases or symmetries. The properties of phases can combine fluidity with orientational order and no or varying degrees of positional order, and can be selected from the group consisting of ferroelectric, ferromagnetic, piezoelectric, and dielectric.

In accordance with yet further embodiments of the disclosure, a method of using the composite condensed matter material is provided. Exemplary methods include applying one or more of heat, light, mechanical stress, electric or magnetic field, and bias to the composite condensed matter material to change an orientation of the composite condensed matter material. One or more properties of the material can be changed by changing the orientation of the composite condensed matter material.

Various devices, such as the devices noted below, can be formed using composite condensed matter material as described herein.

In accordance with embodiments of the disclosure, a display includes a composite condensed matter material as described herein.

In accordance with additional embodiments of the disclosure, a sensor includes a composite condensed matter material as described herein.

In accordance with yet further embodiments of the disclosure, a biodetector includes a composite condensed matter material as described herein.

In accordance with yet further embodiments of the disclosure, methods of forming a composite condensed matter material are disclosed. The methods can include forming particles, providing a nematic host material, and dispersing the particles within the host material to form a colloidal dispersion within the nematic host material. Exemplary methods can additionally include a step of treating the particles. The step of treating can include one or more of surface functionalizing (e.g., using polyethylene glycol) and acid treatment (e.g., using hydrochloric acid).

These and other embodiments will become readily apparent to those skilled in the art from the following detailed description of certain embodiments having reference to the figures; the disclosure not being limited to any particular embodiment(s) disclosed.

BRIEF DESCRIPTION OF THE DRAWING FIGURES

The patent or application file contains at least one drawing executed in color. Copies of this patent or patent application publication with color drawing(s) will be provided by the Office upon request and payment of the necessary fee.

A more complete understanding of the embodiments of the present disclosure may be derived by referring to the detailed description and claims when considered in connection with the following illustrative figures.

FIG. 1 illustrates colloidal discs in a nematic host of molecular rods. a, Scanning electron micrograph of as-synthesized discs. b, Angle $\theta_e$ between $\omega_c$ and $n_m$, as defined in the right-side inset, versus temperature T at $Z^*e \approx +80e$; insets show brightfield micrographs with different disc orientations and a pictorial representation of 5CB molecules with long axes $\omega_m$ within the LC host medium. c, d, Polarising optical micrographs of discs in 5CB at $\theta_e=90°$ obtained between crossed polarisers (white double arrows) without (c) and with (d) a 530 nm retardation plate (slow axis shown by a yellow double arrow); insets represent their computer-simulated counterparts. e-g, Computer-simulated distortions of $n_m$ around a disc at $\vartheta_e=90°$; orange and blue coloring of lines in (e) shows the local $n_m$-directions of tilting, matching the ones revealed experimentally in (d). Colored isosurfaces in (f, g) depict regions where $n_m$-departures away from its far-field background (pink double arrows) are >3° in opposite directions (different colors) within the plane containing the disc's midplane. Black isosurfaces show regions near disc edges where $S_m$ is reduced by ≥5%. h, Center-to-center inter-disc distance versus time, showing how thermal fluctuations dissociate discs weakly "bound at a distance"; insets show brightfield micrographs for initial and final positions. i-l, Green isosurfaces of $n_m$-deformations by >3° in all directions around discs at $\vartheta_e=90°$ (i), 75° (j), 45° (k) and 30° (l). m, regions of reduced $S_m$ and $n_m$-structure at $\vartheta_e=0°$; inset shows details of color-coded $S_m$ at the disc edge scaled by its equilibrium bulk value.

FIG. 2 illustrates Phase diagrams and characterization of phases. a, Diagram of the hybrid LC phases upon variation of the number density ρ, temperature T and colloidal charge $Z^*e$. "Co-ex" labels co-existence regions between neighboring phases. Discs aggregate at $Z^*e<+10e$ when attractions due to orientational elasticity overpower electrostatic repulsions; Wigner-type crystals form at $Z^*e>+100e$. Formation of colloidal columns within the uniaxial nematic at $Z^*e=+20e$ becomes progressively slower with decreasing ρ, but dimers and short columns are found starting from ρ≈0.01 $\mu m^{-3}$ at room temperature (FIG. 1h). T is measured with an error of ±0.1° C.; relative errors of estimating ρ and $Z^*e$ are ±5% and ±1%, respectively. b-d, Fourier analysis of near-neighbour colloidal positions in orthorhombic nematic at ρ=0.34 $\mu m^{-3}$, T=27.0±0.1° C. (b), monoclinic nematic at ρ=0.31 $\mu m^{-3}$, T=30.7±0.1° C. (c), and monoclinic smectic at ρ=0.29 $\mu m^{-3}$, T=31.7±0.1° C. (d). The Fourier analysis is based on 3D imaging and tracking of disc positions with an error <50 nm. e, Theoretical T versus dimensionless concentration $c=\rho D^3 \pi^2/16$ phase diagram for $Z^*e \approx +80e$, corresponding to its experimental counterpart in (a).

FIG. 3 illustrates colloidal orientational order within orthorhombic and monoclinic nematic phases. a-c, Numerical visualisation (a) and photon-upconversion luminescence confocal images of discs in the orthorhombic nematic samples at T=27.0±0.1° C. with ρ=0.34 $\mu m^{-3}$ (b) and ρ=0.31 $\mu m^{-3}$ (c) and with in-plane and out-of-plane $n_c \perp n_m$, respectively; confocal cross-sections are shown by grey planes in (a). d, $f_c(\vartheta,\varphi)$ versus polar $\vartheta - \vartheta_e$ (red curve) and azimuthal φ (blue curve) angles for the orthorhombic nematic at T=27.0±0.1° C. and ρ=0.34 $\mu m^{-3}$. Inset shows directors and widths of orientational distributions in polar (red double arrow) and azimuthal (blue double arrow) directions relative to $n_m$. e-h, Numerical visualisation (e) and confocal cross-sectional images (f-h) showing disc and $n_c$ orientations relative to $n_m$ in the monoclinic nematic phase at ρ=0.31 $\mu m^{-3}$ and at (f) $\vartheta_{ne}=65°±2°$ (f), $\vartheta_{ne}=72°±2°$ (g) and $\vartheta_{ne}=32°±2°$ (h) at temperatures 31.0±0.1° C., 30.7±0.1° C. and 33.0±0.1° C., respectively. Inset in (g) shows a uniform $n_m$ in-between discs at experimental distances, as obtained from Landau-de Gennes modelling, with weak distortions only at disc edges (shown in yellow). i, Δ, S and M versus T while the system transitions between different phases with and without smectic correlations (FIG. 2a); unless smaller than symbols, error bars based on angle measurements are shown. Inset in (i) is a confocal micrograph of the monoclinic nematic with $\vartheta_{ne}=20°±2°$ at ρ=0.31 $\mu m^{-3}$ and T=33.2±0.1° C. j, $f_c(\vartheta,\varphi)$ versus φ at different T and ρ. k, $f_c(\vartheta,\varphi)$ versus $\vartheta$ at ρ=0.28 $\mu m^{-3}$ and different T. l, $f_c(\vartheta,\varphi)$ versus $\vartheta - \vartheta_e$ (red curve) and φ (blue curve) describing disc orientations in a monoclinic nematic at T=33.3±0.1° C. and ρ=0.28 $\mu m^{-3}$. Inset in (l) schematically shows widths of orientational distributions in the polar (red) and azimuthal (blue) directions; note the skewness in the polar-angle plane. Disc charge is $Z^*e \approx +80e$.

FIG. 4 illustrates Order within monoclinic smectic and columnar states. a, b, Photon-upconverting luminescence confocal image (a) and numerical visualisation (b) in the monoclinic smectic at $\rho=0.29$ μm$^{-3}$ and T=31.7±0.1° C. c, The corresponding distributions of the center-to-center distance $r_{sm}$ and smectic layer spacing $\sigma_{sm}$ at different T. d, $f_c(\vartheta)$ in the monoclinic smectic. e, Confocal micrographs and f, numerical visualisation of an orthorhombic columnar nematic at $\rho=0.23$ μm$^{-3}$ and T=27.0±0.1° C. Inset in (e) shows the probability distribution of angles $\Psi$ between individual columns and $n_c$, as defined in (f). g, Distributions of center-to-center distances $r_{nem}$ in the orthorhombic columnar nematic (f) and $r_{col}$ and columnar lattice parameters d$_1$ and d$_2$ in the columnar phase (h) at different T. h, 3D rendering of a columnar oblique primitive cell based on confocal imaging of discs. i, Confocal cross-sections of the columnar phase within planes labeled in (h) showing edge-on discs away from the confining glass surface at depths 1.00±0.05 μm, 3.00±0.05 μm and 5.00±0.05 μm. Red and blue lines beneath the confocal slices highlight the shift of column centers within the cross-sectional scans, consistent with the 3D rendering in (h); $\rho=0.32$ μm$^{-3}$ and T=27.0±0.1° C. Measurement errors are less than ±50 nm for $r_{sm}$, $\sigma_{sm}$, $r_{nem}$, d$_1$, d$_2$, $r_{col}$, and ±1° for $\Psi$ and $\chi$; broad distributions reflect intrinsic spatial variation of these parameters. Disc charges are Z*e≈+80e (a-d) and Z*e≈+20e (e-i).

Figure 7:
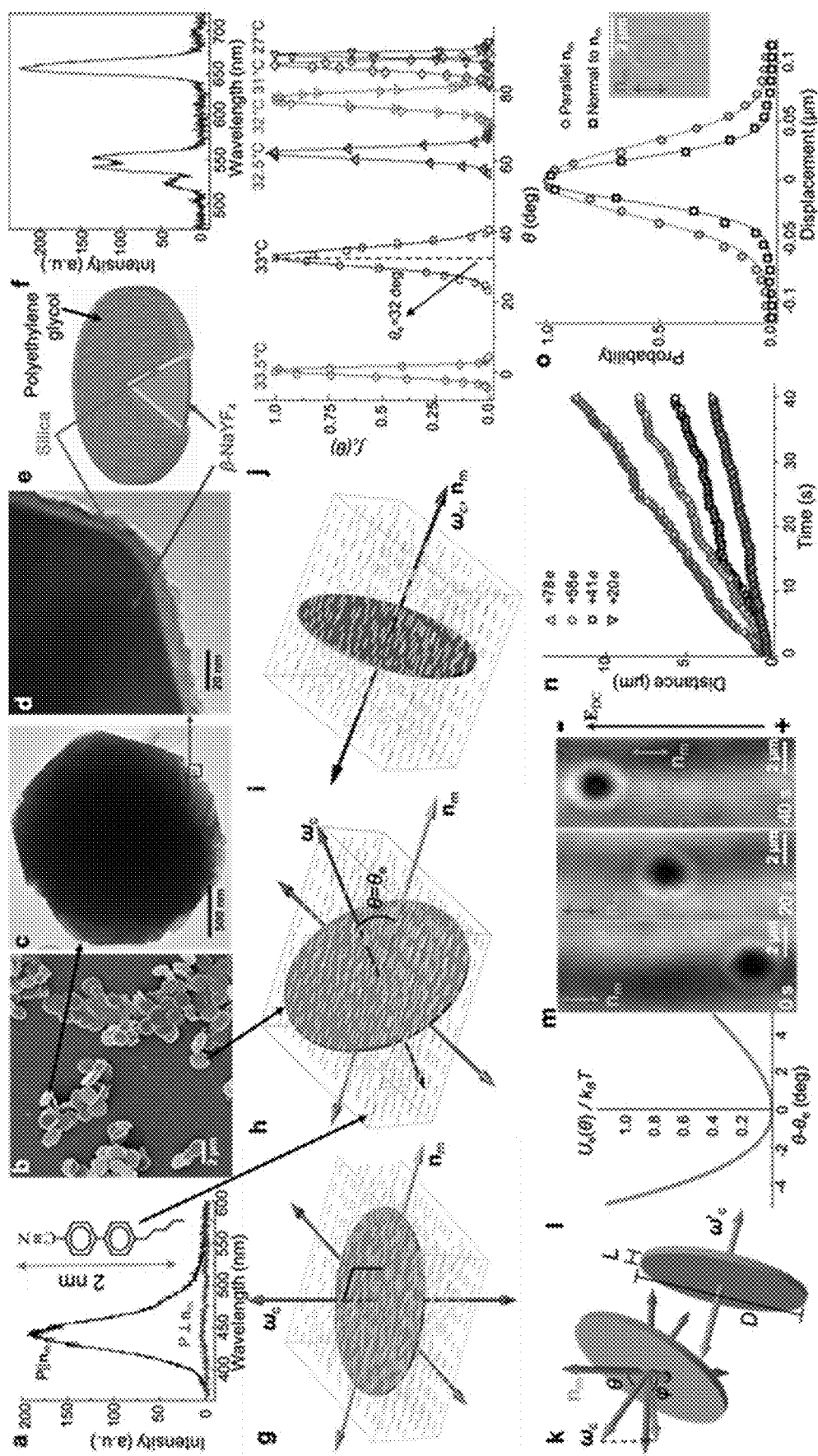

FIG. 7 illustrates Characterization of building blocks of nematic colloids. a, Three-photon excitation fluorescence spectra of 5CB obtained for polarisations of excitation light parallel and perpendicular to $n_m$. Inset shows the chemical structure and length of a 5CB molecule. b, Scanning electron micrographs of silica-coated discs. c, Transmission electron micrograph of a single disc on a copper grid. d, A zoomed-in view of the red-square region in (c) showing the silica layer. e, Schematic of a disc with the NaYF$_4$ core, silica layer and polyethylene glycol functionalization. f, Photon-upconverting luminescence spectrum of discs utilised in confocal imaging. g-i, Simplified schematics of an effective building block of a molecular-colloidal LC formed by a disc (blue) in a fluid host of molecular rods (grey), illustrating its orthorhombic (g), monoclinic (h) and uniaxial (i) symmetries at different orientations. j, Orientational probability versus θ at different T marked next to the distributions. Peaks of the curves in (j) correspond to $\theta_e$, as depicted with a black dashed line at $\theta_e=32\pm1°$ for T=33.0±0.1° C. The error of measuring $\vartheta$ is ±1°. k, Schematics of the main notations. l, Illustration of asymmetry of colloidal surface anchoring potential. m, Time-lapse brightfield micrographs of a disc in 5CB, showing its field-induced motion when subjected to an electric field $E_{DC}$ (indicated by a black arrow) generated by DC voltage of 5V applied to in-plane electrodes 1 mm apart. Elapsed time and $n_m$-orientations are marked on micrographs. n, Displacement versus time for discs with different charges in 5CB when subjected to 5V between a pair of electrodes 1 mm apart. o, Histograms of the disc Brownian displacement probed along and perpendicular to $n_m$ using video microscopy. Solid curves are Gaussian fits to experimental data. Errors of measuring displacements in (n, o) are ±10 nm.

Figure 8:
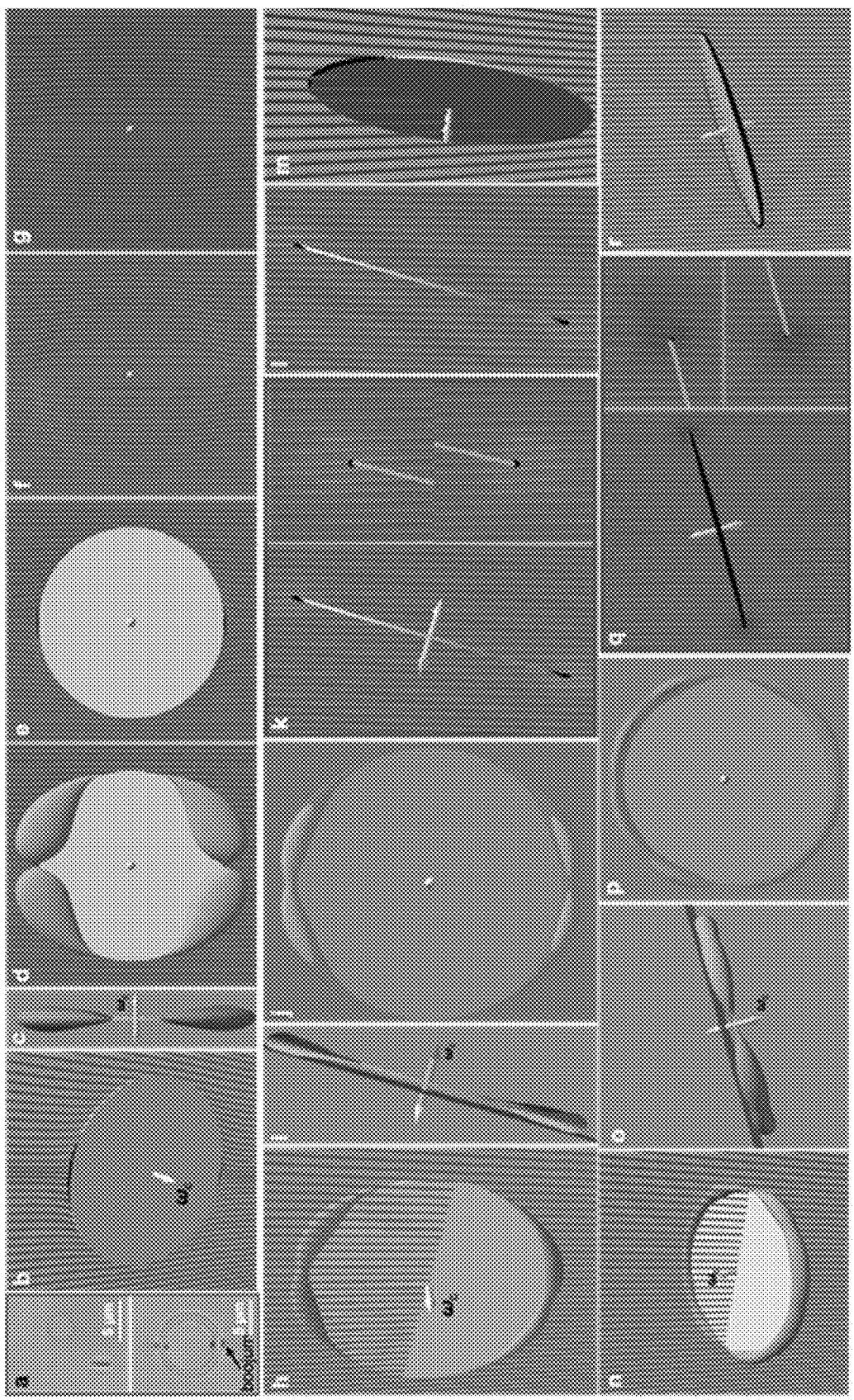

FIG. 8 illustrates comparison and visualization of perturbed nematic order at different disc orientations. a, Comparison of colloidal particles with tangential surface boundary conditions shaped as thin discs with different orientations (top image) and a microring (bottom) in 5CB imaged by brightfield microscopy under similar conditions, with the latter inducing four boojum surface point defects visible as dark, light-scattering spots; no light-scattering singular defects are detected around discs. b-g, Numerical modeling of $n_m$-distortions around a disc at $\vartheta_e=90°$. b-d, Visualization of energy-minimizing $n_m$-distortions around the disc, where the green isosurface-enclosed region indicates deviation of $n_m$ by >2° from its uniform far-field and the black isosurface-enclosed region shows where $S_m$ is reduced by >5% below its bulk equilibrium value; colors of streamlines depict the opposite directions of local $n_m$-tilting relative to disc's midplane. e-g, $n_m$-distortions near the same disc at 0 nm (e), 10 nm (f) and 50 nm (g) away from its midplane. h-m, Numerical modeling of a disc at $\vartheta_e=75°$. h-j, Visualization of energy-minimizing $n_m$-distortions around the disc, where the green isosurface-enclosed region indicates deviation of $n_m$ by >2° from its uniform far-field; a grey pane in (i, j) intersecting the green isosurfaces helps showing the monoclinic symmetry of $n_m$-distortions relative to disc's midplane. k-m, Isosurfaces showing small regions with $S_m$ reduced by >5% below its bulk value (black surfaces) and color-coded local $n_m$-distortions around the disc. Right-side insets in (k) depict details of nematic order perturbations at the disc edges. Field lines in (l) are shown 250 nm away from the disc centre and the single mirror symmetry plane. n-r, Visualisations similar to (h-m) but for $\vartheta_e=30°$. Note the opposite $n_m$-tilt at disc edges as compared to that in (h-m), highlighted by orange/blue coloring.

Figure 9:
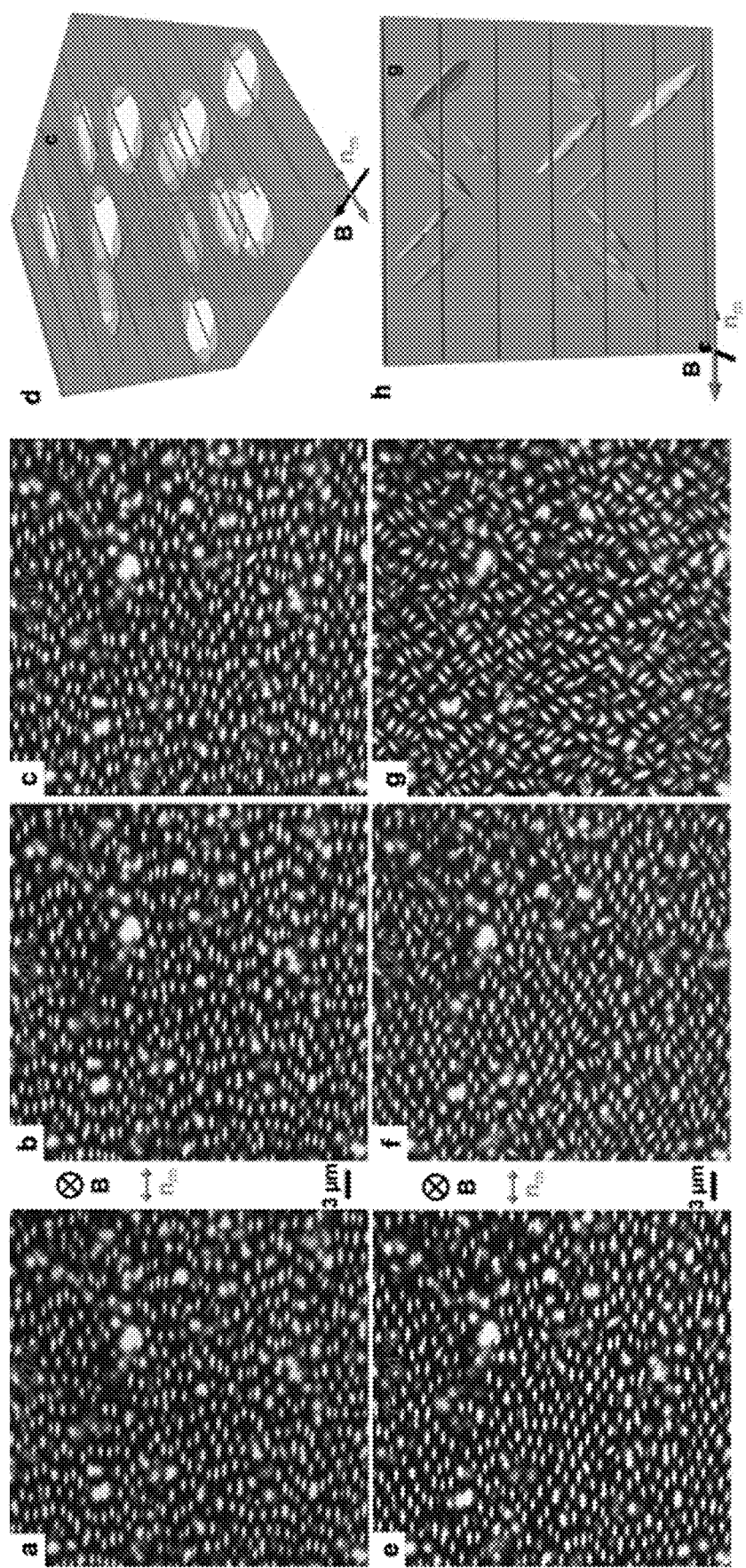

FIG. 9 illustrates temperature-dependent orientations and magnetic control of discs. a-h, Upconversion-based luminescence confocal images (a-c, e-g) and corresponding numerical visualizations (d, h) of disc dispersions at $\rho=0.19$ μm$^{-3}$ with in-plane $n_m$ and $\omega_c$ at T=27.0±0.1° C. (a), T=28.0±0.1° C. (b), T=30.0±0.1° C. (c), T=31.0±0.1° C. (e), T=32.0±0.1° C. (f) and T=33.0±0.1° C. (g), showing the temperature-dependent disc orientations in the presence of a magnetic field. With increasing T at applied field B=100 mT along a normal to sample, a domain with a magnetically induced unidirectional alignment of $\omega_c$ (a, d) transforms into a polydomain state at higher temperatures due to the random $\pm\theta_e$ tilting directionality of $\omega_c$ relative to $n_m$. Image planes are depicted in grey in (d, h). Orientations of $n_m$, magnetic field and scale bars shown between (a, b) and (e, f) are the same for all confocal images presented. The disc surface charge is Z*e≈+80e.

Figure 10:
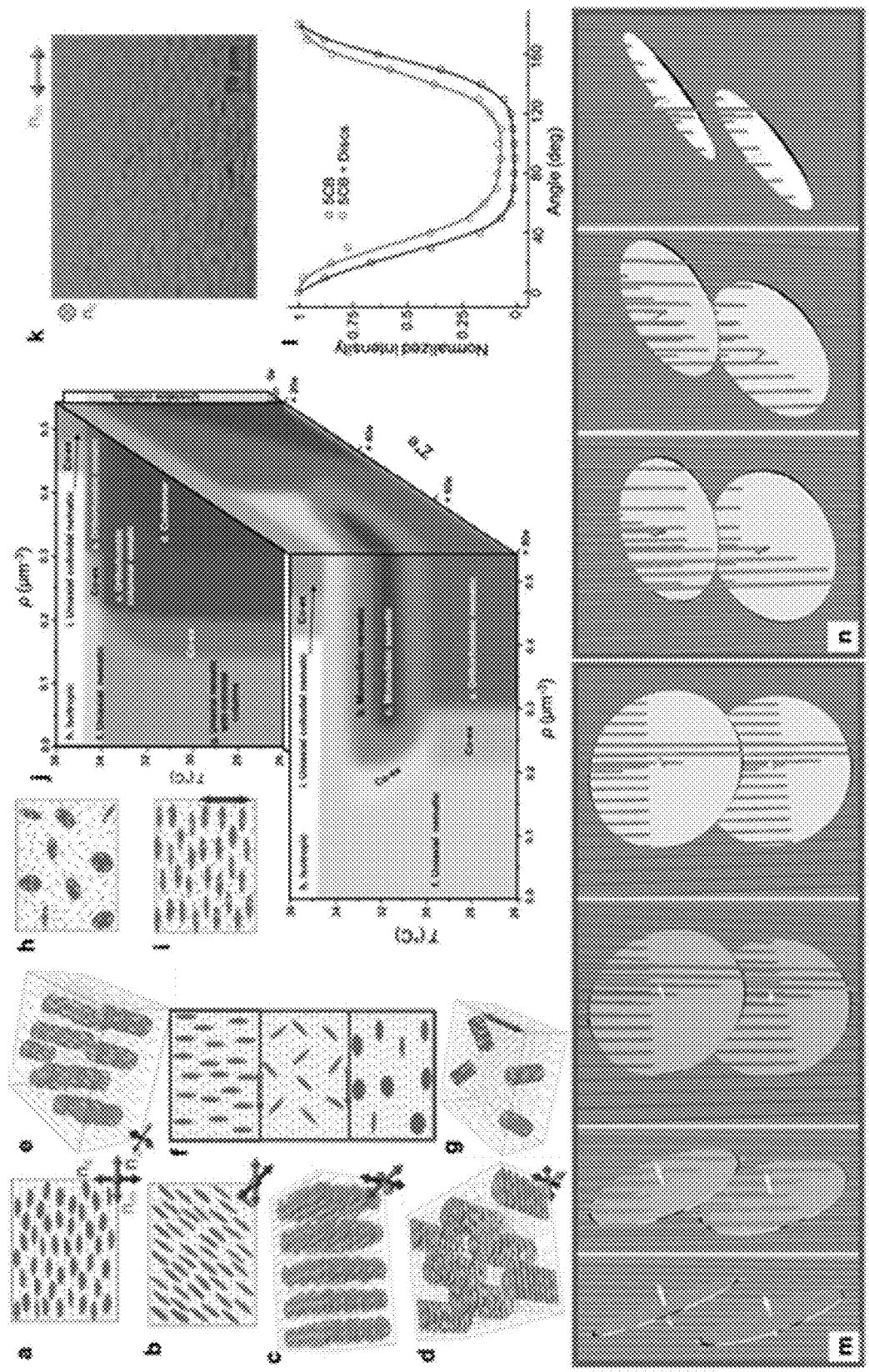

FIG. 10 illustrates coarse-grained visualisation of LC phases and background alignment. a-i, Simplified schematics of different hybrid phases of 5CB molecular rods (grey) and colloidal discs (blue) for the orthorhombic nematic (a), monoclinic nematic (b), monoclinic smectic (c), columnar (d), orthorhombic columnar nematic (e), uniaxial nematic (f), uniaxial nematic with colloidal columns (g), isotropic (h) and colloidal nematic (i). Elementary columnar cell in (d) is depicted in red, with details shown in FIG. 4h. j, Phase diagram upon variation of ρ, T and Z*e, with "Co-ex" labeling co-existence regions. Discs aggregate at Z*e<+10e and form Wigner-type crystals at Z*e>+100e. T is measured with an error of ±0.1°; relative errors for ρ and Z*e are ±5% and ±1%, respectively. k, 3PEFPM image of a 5CB dispersion of discs at $\rho=0.32$ μm$^{-3}$ and T=27.0±0.1° C. for excitation light's linear polarisation parallel $n_m$. l, 3PEFPM intensity, averaged over the field of view, versus the angle between the linear polarisation of excitation light and $n_m$ (measured with an error of less than ±1°) for 5CB with colloidal discs and pure 5CB under the same conditions. m, n, Visualization of $n_m$ between two discs at $\theta_e$=75° (m) and $\theta_e$=30° (n), with black isosurfaces enclosing spatial regions where $S_m$ is reduced by >5% relative to its equilibrium bulk value. Regions of distorted $n_m$ are highlighted by colored streamlines, with blue and yellow depicting the opposite tilt directions.

Figure 11:
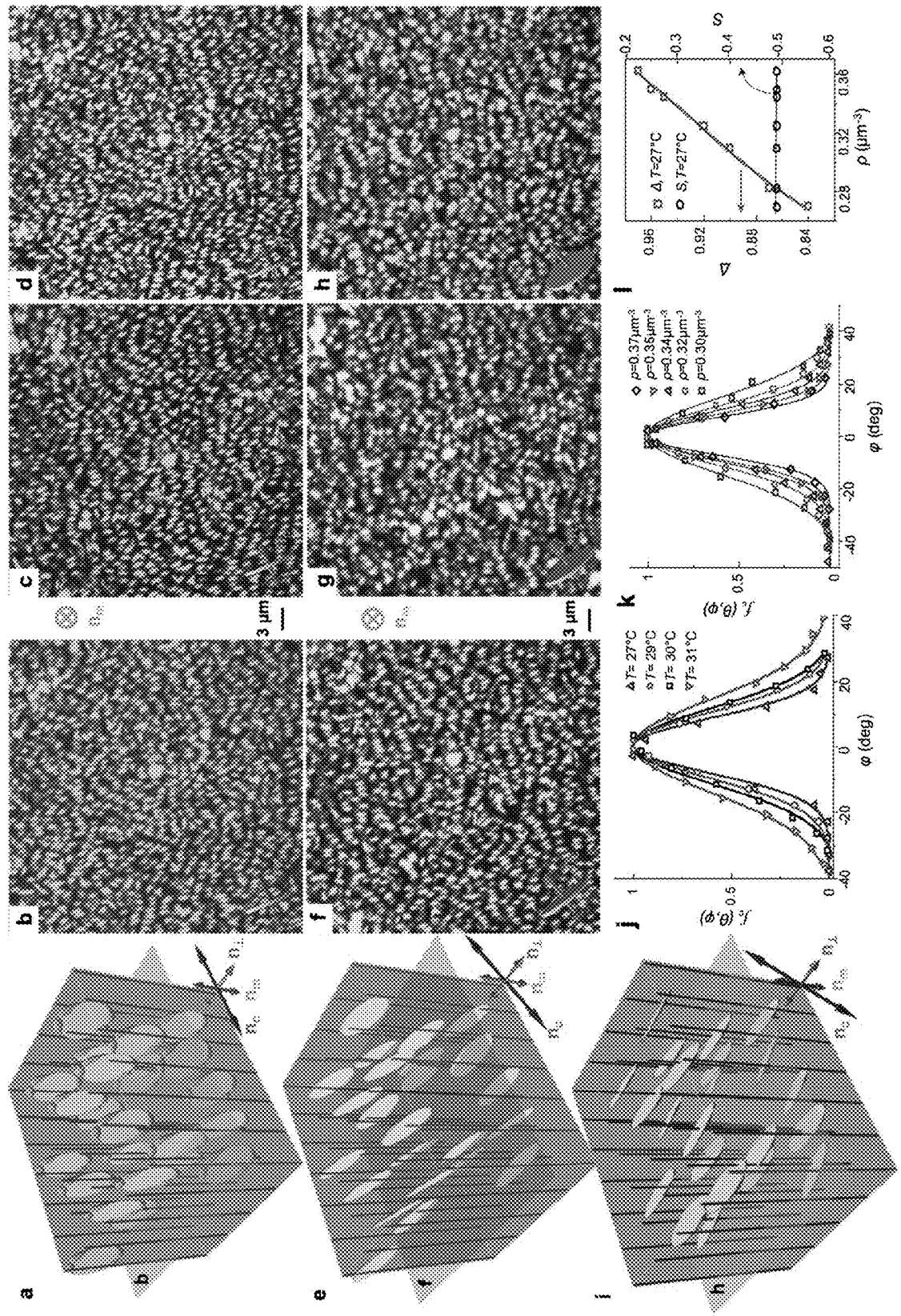

FIG. 11 illustrates colloidal director rotation and nematic ordering versus temperature. a-i, Numerical visualisations (a, e, i) and upconversion-based luminescence confocal images (b-d, f-h) of discs in the monoclinic and orthorhombic nematic phases with out-of-plane $n_m$ at disc number density $\rho$=0.31 µm$^{-3}$ and at T=27.0±0.1° C. (b), T=28.0±0.1° C. (c), T=30.0±0.1° C. (d), T=31.0±0.1° C. (f), T=32.5±0.1° C. (g) and T=33.0±0.1° C. (h). Note the pretransitional smectic correlations in the vicinity of the smectic-phase temperature range in (f, g). $n_c$ tilts out of the sample plane due to the temperature-dependent variation of $\theta_{ne}$, consistent with the elliptical cross-section of discs revealing oblique orientations of $\omega_c$ and $n_c$ relative to $n_m$ at T=32.5±0.1° C. (g) and T=33.0±0.1° C. (h). Grey planes in (a, e, i) depict the orientation of confocal images relative to the directors. Scale bars and $n_m$ orientation shown in-between panels (b, c) and (f, g) are the same for all images. j, $f_c(\vartheta,\varphi)$ versus azimuthal angle $\varphi$ of $\omega_c$ at $\rho$=0.34 µm$^{-3}$ and different T. k, $f_c(\vartheta,\varphi)$ versus $\varphi$ at T=27.0±0.1° C. for different $\rho$. l, $\Delta$ (red squares) and S (black circles) versus $\rho$ at T=27.0±0.1° C. The disc surface charge is Z*e≈+80e.

Figure 12:
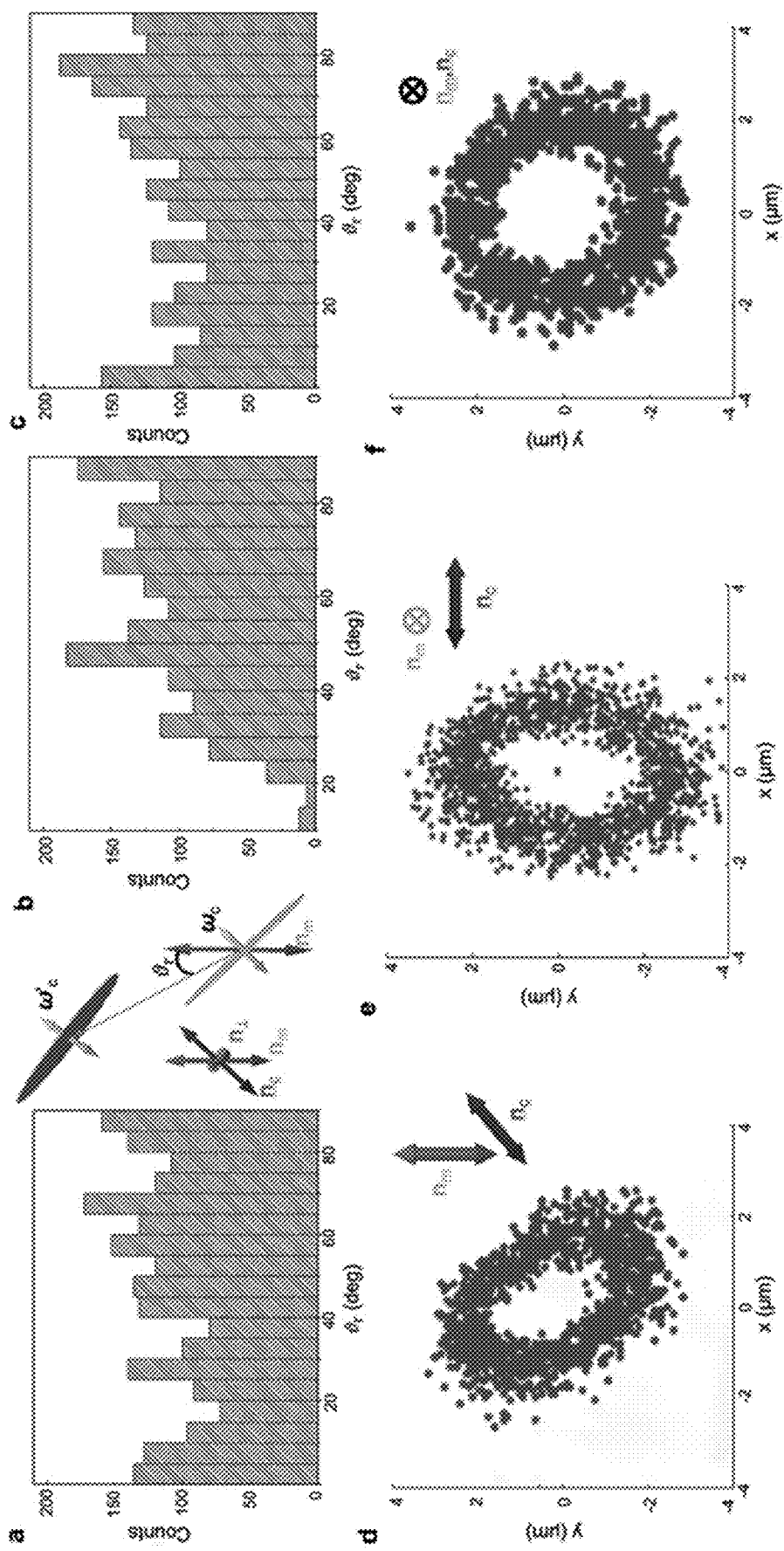

FIG. 12 illustrates characterisation of colloidal interactions within different phases. a-c, Distribution of the angle $\theta_r$ between $n_m$ and the center-to-center pair separation vector, defined in the right-side inset of (a), in the monoclinic nematic at $\rho$=0.31 µm$^{-3}$ and T=30.7±0.1° C. (a), orthorhombic nematic at $\rho$=0.34 µm$^{-3}$ and T=27.0±0.1° C. (b), and uniaxial nematic at $\rho$=0.1 µm$^{-3}$ and T=27±0.1° C. (c). The error of measuring $\theta_r$ is ±2°. d-f, Scatter plots of the nearest-neighbor disc positions in the monoclinic (d), orthorhombic (e), and uniaxial (f) nematic phases at $\rho$ and T corresponding to (a-c), respectively. Anisotropic distributions in (d) and (e) correlate with the ordering of discs with $n_c$ at $\theta_{ne}$≈70° (d) and $\theta_{ne}$=90° (e). The disc surface charge is Z*e≈+80e.

Figure 13:
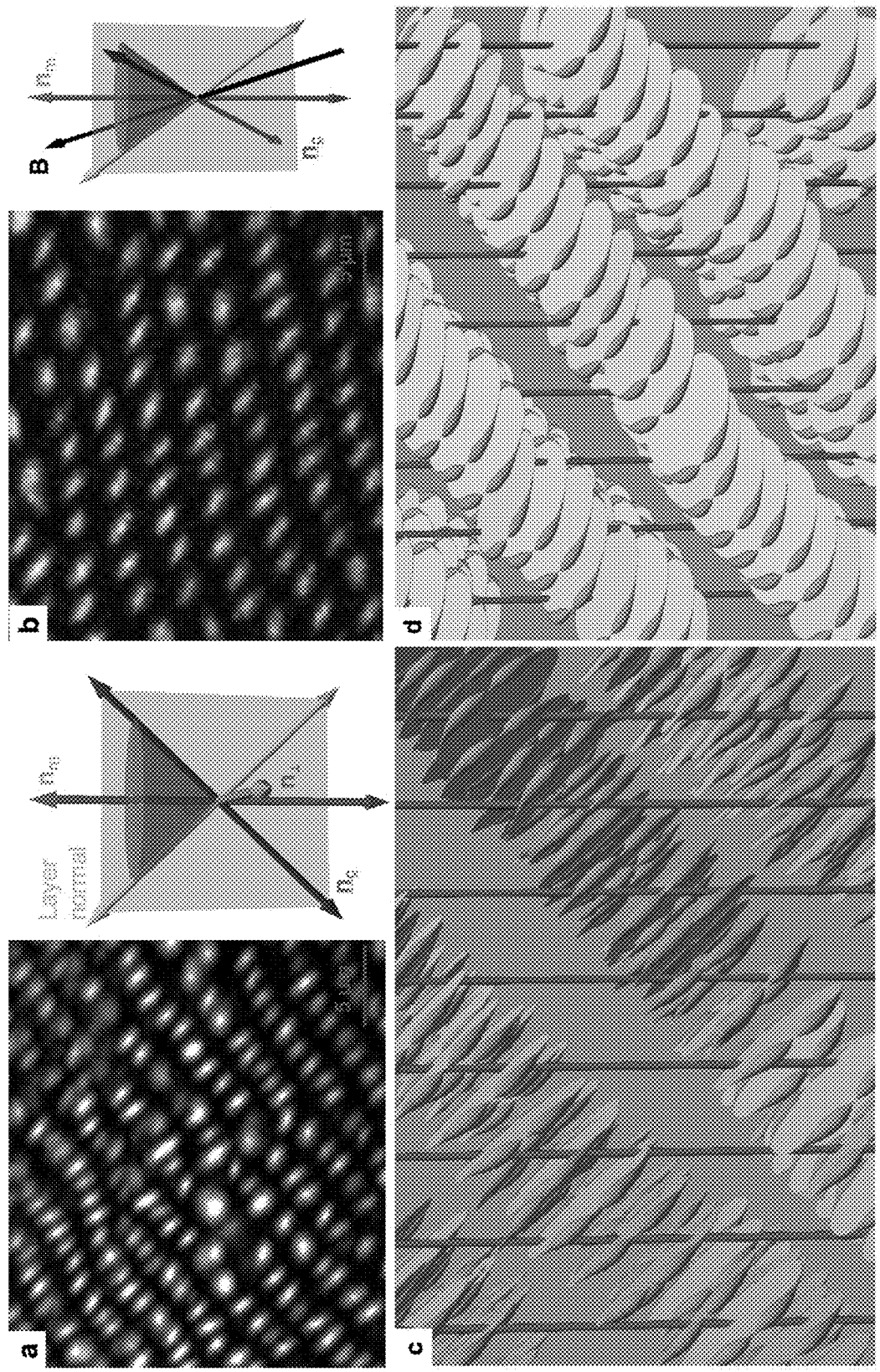

FIG. 13 illustrates monoclinic and magnetic-field-induced triclinic smectic order. a-d, Upconversion-based luminescence confocal microscopy images (a, b) and numerical visualizations (c, d) of discs in the monoclinic smectic phase at $\rho$≈0.3 µm$^{-3}$, T=32.3±0.1° C. and $\theta_{ne}$≈45° (a, c) and for the magnetically induced triclinic smectic state under otherwise similar conditions (b, d). Smectic layer normal (yellow double arrow), $n_c$ and $n_m$ are initially within the image plane (a, c), but then $n_c$ is rotated out of the image plane by a magnetic field B=100 mT (b), thus switching the smectic order from monoclinic (a, c) to triclinic (b, d). This switching is driven by the tendency of $\omega_c$ and $n_c$ to align perpendicular to B, where the disc normals also tend to reside on a cone of easy-angle $\omega_c$-orientations. Right-side insets of (a, b) show the layer normal, $n_m$, $n_c$, $n_\perp$ and the applied magnetic field B for the monoclinic and the triclinic smectic states, respectively. The layer normal, $n_c$ and $n_\perp$ are all mutually orthogonal and layer normal, $n_c$ and $n_m$ are all coplanar in (a) but not in (b), which lacks nontrivial symmetry operations and represents triclinic symmetry.

Figure 14:
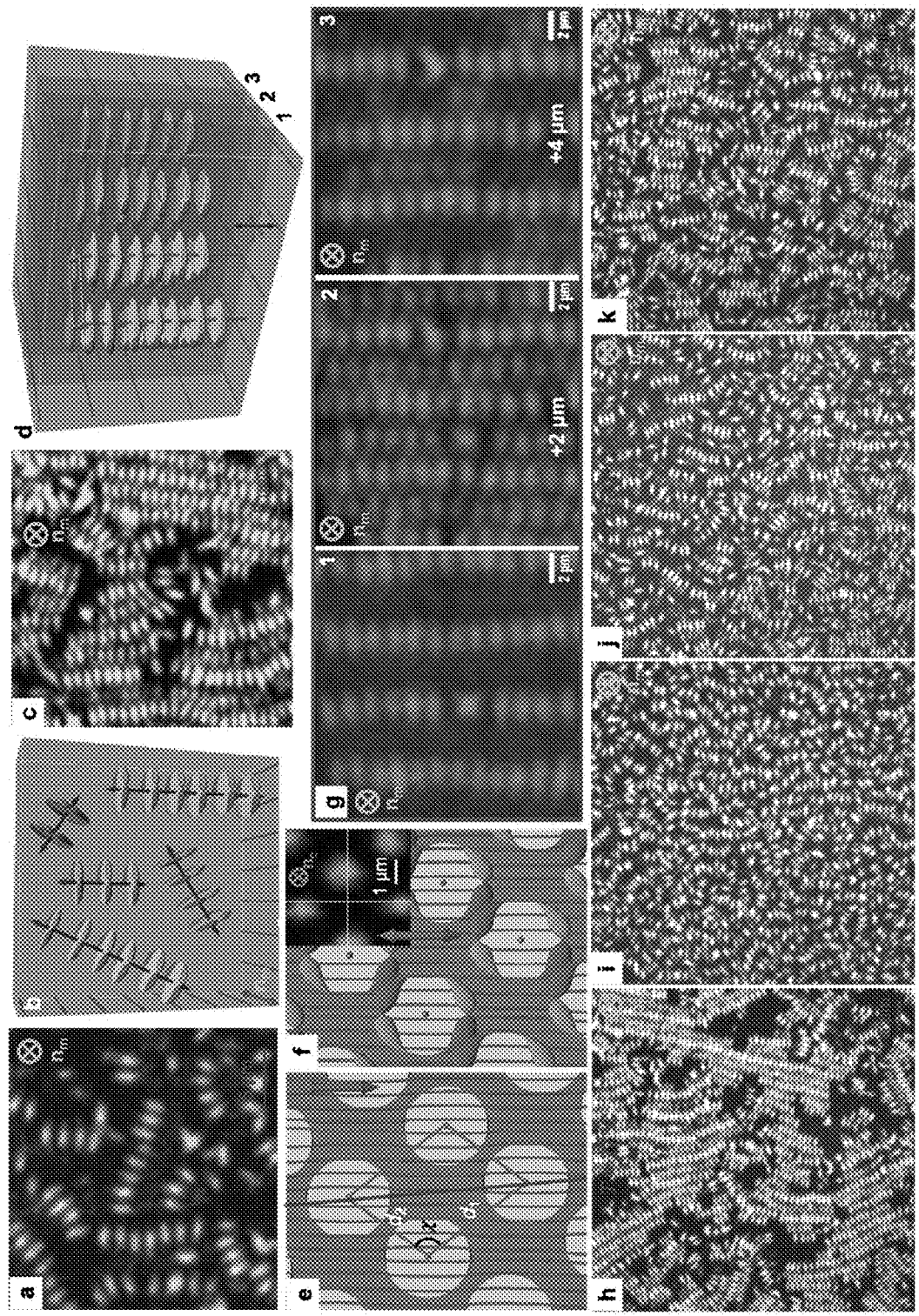

FIG. 14 illustrates nematic and monoclinic columnar phases and their thermal melting. a-c, Upconversion-based luminescence confocal micrographs (a, c) and numerical visualisation (b) showing a uniaxial nematic with differently oriented columns at $\rho$=0.08 µm$^{-3}$ and T=27.0±0.1° C. (a, b) and colloidal structure of the biphasic nematic-columnar co-existence region at $\rho$=0.17 µm$^{-3}$ and T=27.0±0.1° C. (c). d-g, Monoclinic columnar phase with a two-dimensional oblique lattice characterized experimentally (f, g) and numerically (d-f). Inset in (f) shows the ordering of columns in a sample with out-of-plane $n_c$ and in-plane $n_m$, revealing the oblique lattice of colloidal columns. Probing the distribution of the oblique lattice parameters defined in (e) across multiple sample regions yields angles $\chi$=110±5°; $d_1$=1.67±0.15 µm, $d_2$=1.75±0.15 µm. The angle between the diagonal of the oblique primitive cell and $n_m$ varies within 5°-7°. Measuring error is ±1° for angles and ±50 nm for $d_1$ and $d_2$. Colored $n_m$-director streamlines in (e) depict $n_m$-distortions right above the discs. Orange/blue isosurfaces in (f) show enclosed regions where local $n_m$ orientation departs from its far-field by >2°, with colors corresponding to tilt directionality of the streamlines in (e). g, Confocal cross-sections of the columnar phase showing discs at sample depths shifted by 2 µm (depth increases left-to-right, starting at 6 µm away from a confining surface), corresponding to the grey planes labeled in (d); $\rho$=0.32 µm$^{-3}$ and T=27.0±0.1° C. h, i, Confocal images of discs at $\rho$=0.19 µm$^{-3}$ that show melting of colloidal columns upon temperature increase from T=27.0±0.1° C. (h) to T=33.0±0.1° C. (i). j, k, Columns re-emerge upon decreasing T, as revealed by confocal images at T=30.0±0.1° C. (j) and T=27.0±0.1° C. (k). The disc charge is +20e.

Figure 15:
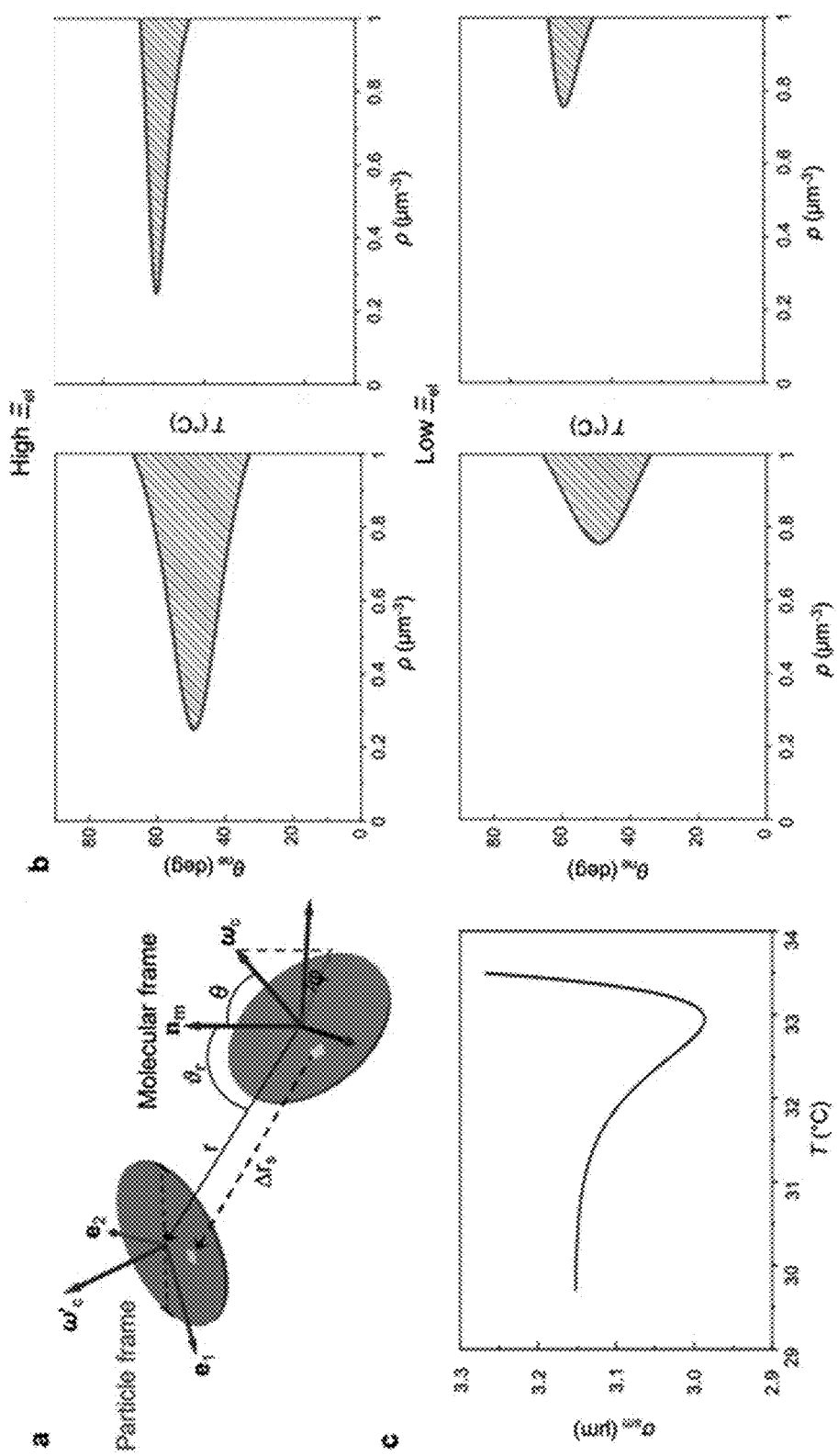

FIG. 15 illustrates Stability analysis of phases with partial positional order. a, A schematic showing the principal reference frames, vectors and angles used in the analytical model. b, Phase diagrams with coordinate axes $\vartheta_{ne}$ versus $\rho$ (left column) and T versus $\rho$ (right column) of the molecular-colloidal LC for higher (0.002, top row) and lower (0.001, bottom row) $\Xi_{el}$. Red-shaded regions represent the monoclinic smectic phase, consistent with the experimental diagram (FIG. 2a). For lower $\Xi_{el}$ (weak elastic interactions), the phases with partial positional order appear at higher disc concentrations due to stronger electrostatic repulsions between the discs. c, Theoretical estimation of the smectic layer spacing $\sigma_{sm}$ versus T in the monoclinic smectic phase.

It will be appreciated that elements in the figures are illustrated for simplicity and clarity and have not necessarily been drawn to scale. For example, the dimensions of some of the elements in the figures may be exaggerated relative to other elements to help improve understanding of illustrated embodiments of the present disclosure.

DETAILED DESCRIPTION OF EXEMPLARY EMBODIMENTS OF THE DISCLOSURE

The description of exemplary embodiments provided below is merely exemplary and is intended for purposes of illustration only; the following description is not intended to limit the scope of the disclosure or the claims. Moreover, recitation of multiple embodiments having stated features is not intended to exclude other embodiments having additional features or other embodiments incorporating different combinations of the stated features.

In this disclosure, any two numbers of a variable can constitute a workable range of the variable, and any ranges indicated may include or exclude the endpoints. Additionally, any values of variables indicated (regardless of whether they are indicated with "about" or not) may refer to precise values or approximate values and include equivalents, and may refer to average, median, representative, majority, or the like. Further, in this disclosure, the terms "including," "constituted by" and "having" can refer independently to "typically or broadly comprising," "comprising," "consisting essentially of," or "consisting of" in some embodiments. In this disclosure, any defined meanings do not necessarily exclude ordinary and customary meanings.

Composite condensed matter material in accordance with examples of the disclosure includes a host material comprising molecules having a first shape and tending to form a molecular liquid crystal and particles dispersed and suspended within the host material, the particles having a second shape, the second shape being the same or different from the first shape. The particles can be surface functionalized as described herein to mitigate aggregation of the particles and to facilitate orientation of the particles different from the orientation of molecules. The composite condensed matter material exhibits reconfigurable properties.

EXAMPLES

The examples described below illustrate various composite condensed matter materials and methods of forming and using the composite condensed matter material. The examples are illustrative and are not meant to limit the scope of the invention.

The examples below describe highly anisotropic charged colloidal discs in a nematic host composed of molecular rods that provide a platform for observing many low-symmetry phases. Depending on temperature, concentration and surface charge of the discs, nematic, smectic and columnar organizations with symmetries ranging from uniaxial 1,2 to biaxial orthorhombic and monoclinic were found. With increasing temperature, unusual transitions from less to more ordered states and re-entrant phases were observed. Importantly, we demonstrate the presence of monoclinic colloidal nematic order, as well as the thermal and magnetic control of low-symmetry self-assembly. These findings are supported by modeling of the colloidal interactions between discs in the nematic host and provide a route towards myriads of new condensed matter phases in systems with dissimilar shapes (or orientation different from the host material) and sizes of building blocks, as well as their technological applications.

The below examples illustrate the emergence of monoclinic and orthorhombic orientational order in dispersions of thin colloidal discs within a nematic liquid crystal (LC) composed of rod-like molecules, where both molecular and colloidal components lack such symmetry properties on their own. Competing electrostatic and elastic interactions interplay with the temperature-dependent boundary conditions on the colloidal surfaces so that the discs rotate relative to the LC host with changing temperature, transforming symmetry of the ensuing nematic colloidal building blocks and reconfiguring their interactions. To unambiguously demonstrate self-assembly of these LC colloids into monoclinic nematic and other low-symmetry states, we directly characterize them by three-dimensional (3D) optical imaging through selective excitation of the discs and molecules by a tunable femtosecond laser. The average local orientation of long axes of rod-like molecules of a nematic host pentylcyanobiphenyl (5CB), described by a molecular director $n_m$ (FIG. 7a) is probed by exploiting the strong polarization dependence of three-photon excitation fluorescence from 5CB. The β-NaYF4:Yb/Er discs with strong photon-upconverting luminescence are designed to allow for probing their orientations and positions (FIG. 1a, b, FIG. 7b-l) via direct confocal imaging. Highly anisotropic discs are stabilized against aggregation through surface functionalization, which also imparts self-reconfigurability of boundary conditions at their surfaces. To this end, hydrothermally synthesized 10 nm-thick discs of diameter controlled within D=1.2-2.2 μm are coated with thin (≤5 nm) silica layers and then functionalized with polyethylene glycol (FIG. 1a, FIG. 7b-e). The disc charge in 5CB with Debye screening length of $\xi_D$=0.1-0.5 μm is controlled within $Z^*e \approx +(0-100)e$ ($Z^*$ is the effective number of elementary charges e) 10 and characterized using electrophoretic colloidal mobility (FIG. 7m-o). Dispersions of discs in 5CB are infiltrated into glass cells, rectangular capillaries or microfabricated containers of various micrometer-to-inch dimensions, with the inner confinement surfaces treated to impose strong perpendicular or tangential boundary conditions for $n_m$. Confocal cross-sectional imaging planes are then aligned relative to symmetry axes of colloidal dispersions. 3D imaging with resolution <500 nm resolves individual discs within different phases and image analysis reveals their positions and orientations relative to $n_m$ with respective precision of 10-50 nm and 1-2°, depending on imaging depth in thick samples. This direct 3D imaging of discs unambiguously probes purely orientational order in translationally invariant nematic colloidal phases and also positional order in smectic and columnar phases.

Colloidal particles locally distort the molecular nematic order because of anisotropic interactions at their surfaces, which for microparticles result in singular topological defects (FIG. 8a) and strong elasticity-mediated interactions with binding energies thousands of times stronger than the thermal energy. Polarizing microscopy and numerical modeling consistently reveal only weak perturbations of the nematic order around thin discs with soft boundary conditions and large-area faces parallel to the far-field $n_m$ (FIG. 1c-f). Close to disc edges, $n_m$ locally departs from its uniform far-field background by a few degrees and the molecular scalar order parameter $S_m = \langle 3(\omega_m \cdot n_m)^2 - 1 \rangle /2$ decreases by only a few percent relative to its equilibrium bulk value (FIG. 1e), so that reduction of the latter cannot be detected with brightfield imaging (FIG. 8a); $\omega_m$ and $\langle \rangle$ denote the symmetry axes of rod-like molecules and an ensemble average. Electrostatic repulsions between like-charged discs at $Z^*e>+50e$ overpower anisotropic elastic interactions that attract regions of the same particle-induced tilt of $n_m$, relative to its uniform background (depicted in FIG. 1c-g) to minimize the host nematic's free energy. Colloidal "binding at a distance" occurs when electrostatic and elastic forces balance each other at lower $Z^*e$, though this binding is weak and thermal fluctuations often destroy it (FIG. 1g, h).

Figure 1:
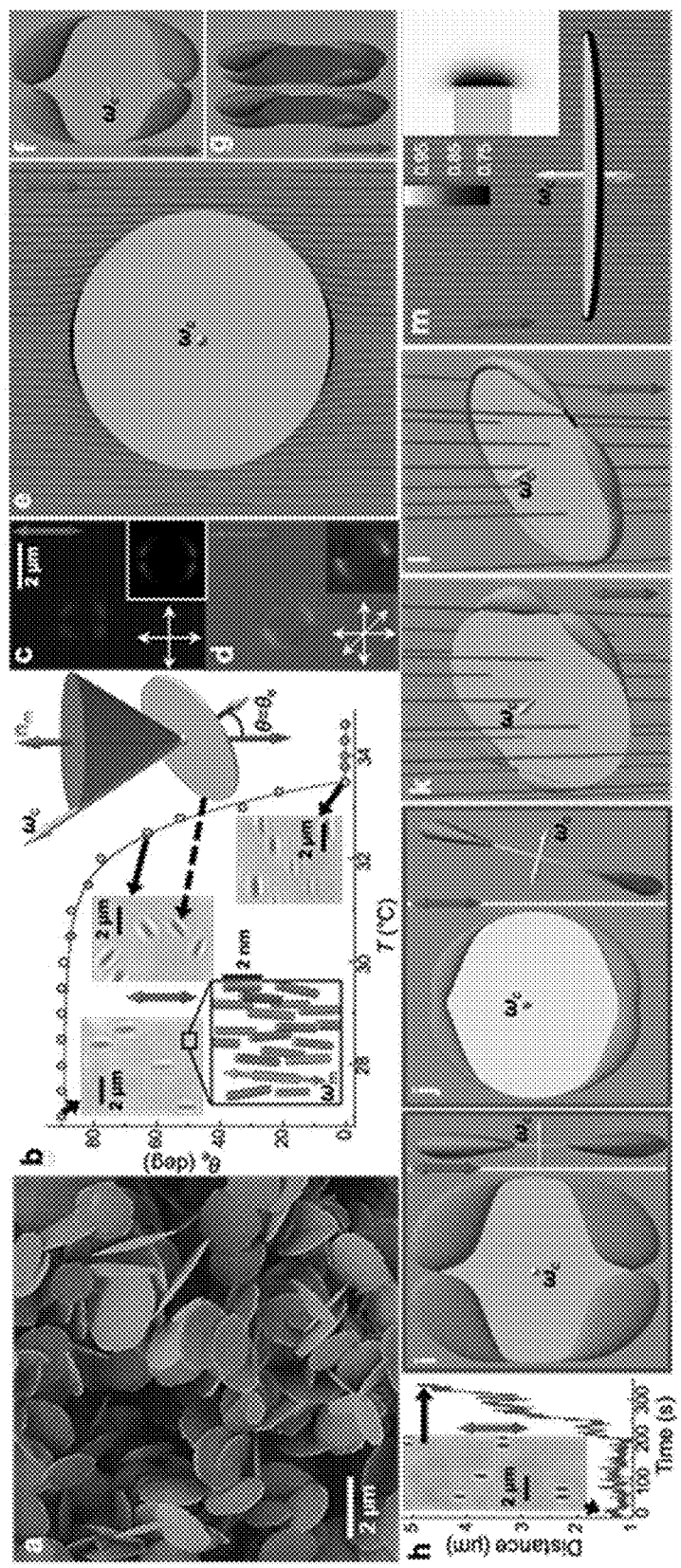

Discs spontaneously rotate relative to $n_m$ with increasing temperature at $Z^*e \approx +(50-100)e$, with their orientations quantified by polar and azimuthal angles θ and φ (FIG. 1b and FIG. 7k). This reorientation arises from changing boundary conditions due to an interplay between electrostatic and temperature-dependent molecular interactions at colloidal surfaces. While chemically specific molecular (electrostatic) interactions favor orientations of 5CB molecules parallel (perpendicular) to disc surfaces, their competition yields narrow orientational distributions of disc normals $\omega_c$ relative to $n_m$ and an equilibrium polar angle $\theta = \theta_e$ at a given temperature (FIG. 7g-l). The "corona" of local disc-induced perturbations of orientational order preserves the $D_{\infty h}$ symmetry of discs and 5CB at $\omega_c \| n_m$, but morphs to exhibit $D_{2h}$ symmetry for $\omega_c \perp n_m$ and $C_{2h}$ symmetry for $\omega_c$ orientated obliquely to $n_m$ (FIG. 1e-m, FIG. 8). In dilute dispersions, thermal fluctuations freely rotate such discs around $n_m$ and the overall colloidal dispersion retains the uniaxial $D_{\infty h}$ symmetry of the 5CB nematic host. However, increasing the disc number density ρ leads to correlations of $\omega_c$-orientations, which can be controlled by an external magnetic field B that aligns $\omega_c \perp B$ (FIG. 9). The delicate interplay of anisotropic steric, electrostatic and elastic interactions is harnessed to obtain low-symmetry colloidal organizations that vary with temperature and both charge and concentration of discs (FIG. 2 and FIG. 10a-j). The emergent orientational order of discs is characterized by a nonpolar colloidal director $n_c$, a spontaneously selected average $\omega_c$-orientation. We observe a plurality of phases (FIG. 2), including nematic colloidal fluids with uniaxial, orthorhombic and monoclinic symmetries, as well as smectic and columnar phases that additionally feature positional correlations. Polarisation-sensitive three-photon excitation fluorescence microscopy reveals that the "substrate" LC host preserves a uniform far-field $n_m$-background at the used volume fractions of discs up to ~1.5% and temperatures ≤34.6° C., with only weak perturbations of the host nematic's order near the disc edges, irrespective of phase symmetry (FIG. 10k-n).

Direct 3D imaging reveals how low-symmetry phases arise with increasing ρ of freely diffusing nematic colloidal building blocks that comprise discs within an aligned 5CB host, with weakly perturbed local molecular order around disc edges (FIG. 3, FIGS. 10-12). Orientational distribution functions $f_c(\omega_c)$, derived from image analysis, quantify the order through the uniaxiality, biaxiality and monoclinicity order parameters, respectively given by:

$$S = \int d\omega_c f_c(\omega_c) \, \mathcal{P}_2(\omega_c)$$

$$\Delta = \int d\omega_c f_c(\omega_c) D_2(\omega_c)$$

$$M = \sin(2\theta_{ne}) \quad (1)$$

where $\mathcal{P}_2(\omega_c) = \frac{3}{2}\cos^2\theta - \frac{1}{2}$, $D_2(\omega_c) = \sin^2\theta \cos 2\varphi$ and $\theta_{ne}$ is the angle between $n_c$ and $n_m$. In an orthorhombic $D_{2h}$ nematic, one finds $n_c \perp n_m$ in samples with both out-of-plane and in-plane $n_m$ (FIG. 3a-c), with the narrow 4-8° polar and broader 15-30° azimuthal widths of $f_c(\theta,\varphi)$ (FIG. 3d). For the monoclinic $C_{2h}$ nematic, $n_c$ and $n_m$ orient obliquely to each other (FIG. 3e-i). Azimuthal distributions $f_c(\varphi)$ broaden with increasing temperature and become narrower with increasing ρ, driving the corresponding variations of Δ (FIG. 3j and FIG. 11j-l). As the polar distributions $f_c(\theta)$ morph and shift with temperature and $n_c$ rotates relative to $n_m$ (FIG. 3k), S varies from ≈−0.5 to ≈1 when the system transitions between orthorhombic $D_{2h}$, monoclinic $C_{2h}$ and uniaxial $C_{\infty h}$ states, before dropping to S=0 at the transition to high-temperature isotropic phase (FIG. 3i). The corresponding biaxiality changes from Δ≈1 to Δ=0 with increasing temperature, whereas the geometric monoclinicity parameter M=0 in both uniaxial and orthorhombic limits but is nonzero in the monoclinic phase (FIG. 3i). The monoclinic $f_c(\theta,\varphi)$ has only one mirror symmetry plane at $\varphi=0$ (FIG. 3l) and features a skewed distribution in θ, with fluctuations of the polar disc orientations about the equilibrium $\theta_{ne}$ being fundamentally asymmetric. The monoclinic nature of the nematic state is manifested not only by the oblique orientation of $n_c$ and $n_m$, but also at the level of colloidal order alone (FIG. 3l). S≠0 and Δ≠0 reflect the presence of different aligning directions while geometric monoclinicity M≠0 and the skewness of $f_c(\theta,\varphi)$ reveal the orientational monoclinic order. While monoclinic and orthorhombic crystals reflect symmetries of crystallographic lattices, we show how lattice-free nematic colloids can exhibit such symmetries at the level of orientational fluid order alone. The frame of the orthorhombic nematic (FIG. 3a-d) is spanned by π-rotation symmetry axes $n_m \perp n_c \perp n_\perp$, where pairs of these directors define the system's mirror symmetry planes. The monoclinic nematic, however, has only one π-rotation axis $n_\perp$ orthogonal to a single mirror symmetry plane containing $n_m$ and $n_c$ (FIG. 3e-l). Fourier analysis of near-neighbour disc separation vectors reveals how these symmetries of orientational order coexist with uninhibited fluidity, without positional correlations (FIG. 2b, c, FIG. 12). Nevertheless, pretransitional local smectic correlations emerge near the smectic phase and remotely resemble cybotaxic molecular clusters in conventional LCs.

Figure 2:
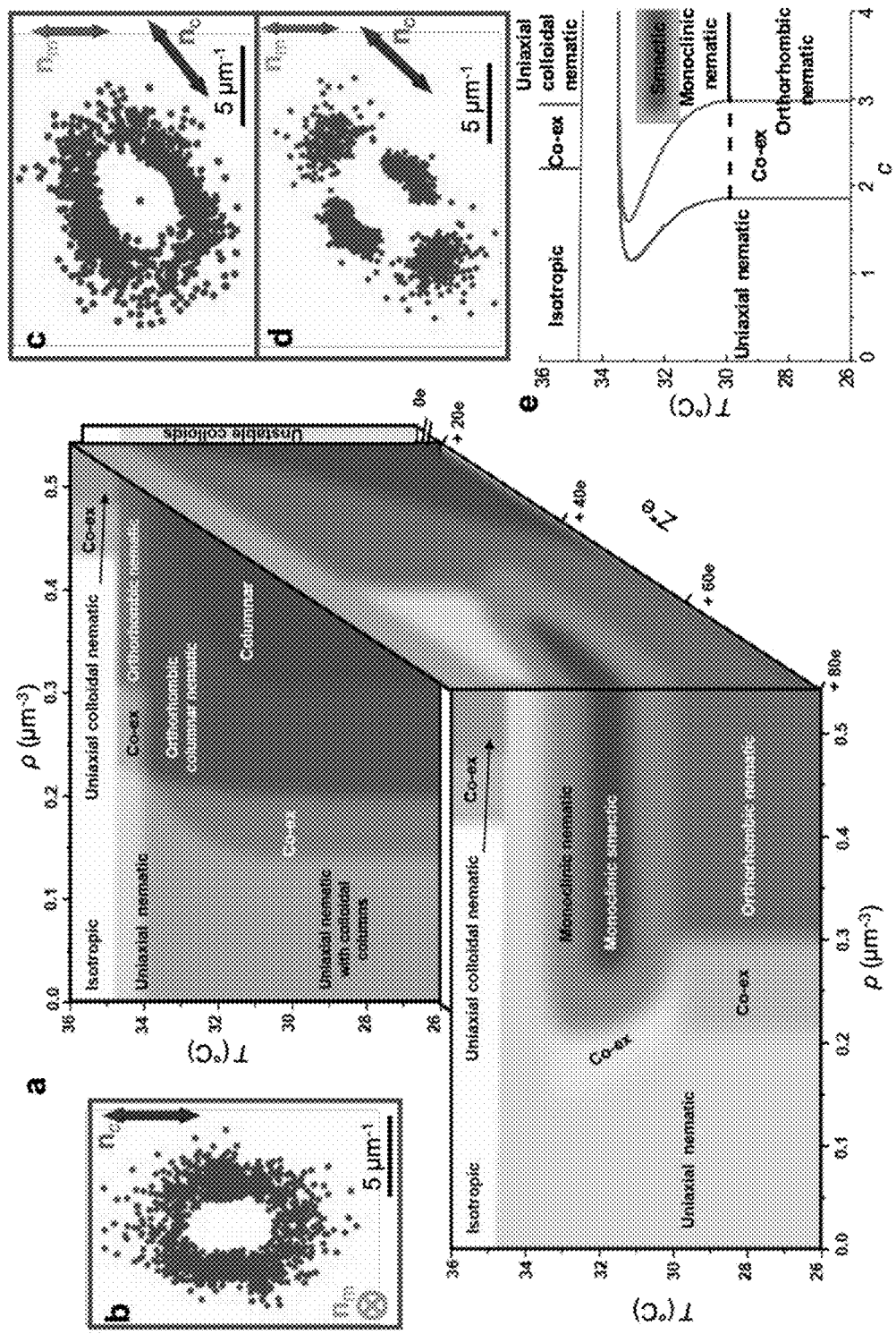
Figure 3:
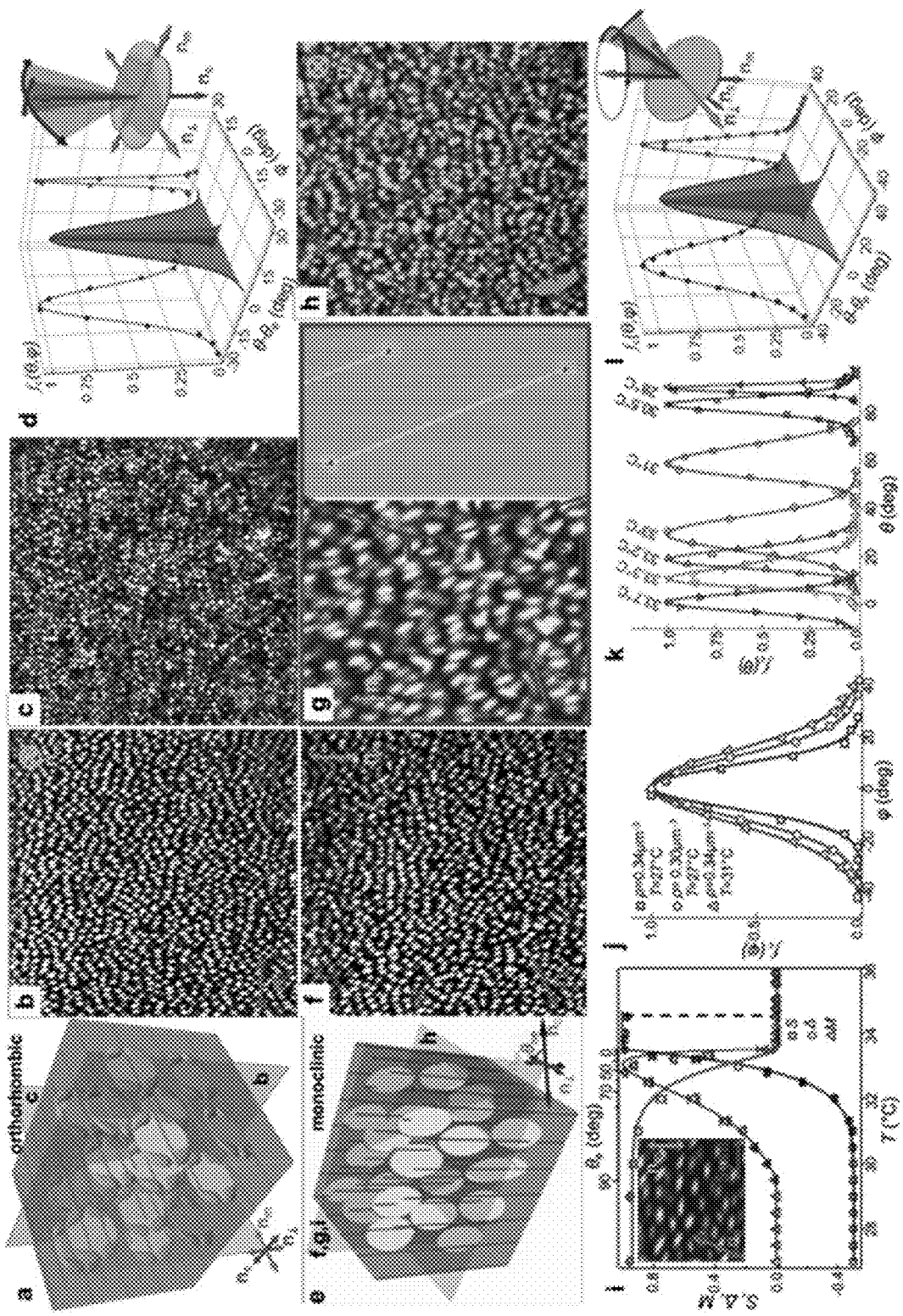

At $Z^*e \approx +(50\text{-}100)e$ and room temperature, increasing ρ drives a uniaxial-orthorhombic nematic transition when the normals $\omega_c$ self-organize along $n_c \perp n_m$ (FIGS. 2a, b and 3a-d). Increasing ρ at elevated temperatures 30-33.5° C. instead leads to a transition from the uniaxial nematic to monoclinic nematic and smectic phases, each with $C_{2h}$ symmetry (FIGS. 2a, c, d, 3e-l and 4a-d). Increasing temperature at ρ≥0.3 μm$^{-3}$ transforms the orthorhombic nematic (FIGS. 2a, 3a-d) into a lower-symmetry monoclinic $C_{2h}$ nematic (FIG. 3e-l), subsequently into a $C_{2h}$ smectic (FIG. 4a-d), followed by a re-entrant monoclinic $C_{2h}$ nematic and a hybrid molecular-colloidal $D_{\infty h}$ uniaxial nematic, before crossing over into either an isotropic phase or a uniaxial colloidal nematic state (FIG. 10h-j), depending on ρ. Conventional phase transitions with increasing temperature tend to melt ordered states in stages towards full disorder. By contrast, we observe the formation of more ordered, lower-symmetry monoclinic nematic (including re-entrant) and smectic states upon heating the orthorhombic nematic LC (FIG. 2). Such "freezing by heating" here emerges within an equilibrium setting from the symmetry breaking prompted by changes of LC-colloidal surface coupling and the ensuing interplay of elastic, electrostatic and steric interactions. When $\omega_c$ reside on a $\theta_e$-cone relative to $n_m$ (0<$\theta_e$<π/2), the threshold for the uniaxial-biaxial transition with increasing ρ also reduces (FIG. 2a) because discs access fewer orientational states as compared to the $\omega_c \perp n_m$ case. Elastic interactions in the vicinity of $\theta_e \sim \pi/4$ stabilize a $C_{2h}$ smectic LC featuring one-dimensional positional order of discs that freely move within layers, with the nearest-neighbor distances $r_{sm}$ being smaller than the layer spacing $\sigma_{sm}$ (FIG. 4a-d).

The temperature-dependent interplay between various colloidal interactions allows for real-time reversible thermal reconfiguration of assemblies. As an example, the out-of-equilibrium transformation of a $D_{2h}$ orthorhombic into a $C_{2h}$ monoclinic nematic is followed by the formation and subsequent dissociation of smectic colloidal layers with $C_{2h}$ symmetry upon a modest ~5° C. temperature change, all within ~15 min. This reconfiguration is enriched by our system's facile response to external fields. For example, by exploiting the magnetic response of discs, which tends to orient $\omega_c \perp B$, we show that $n_c$ of the smectic can be rotated by a 100 mT field from its original orientation within layers to make an oblique angle with the plane containing the layer normal and $n_m$, thus yielding a $C_{1h}$-symmetry (FIG. 13). This triclinic smectic structure has no symmetry operations other than trivial and is induced at merely 100 mT, which would have negligible effects on conventional LCs, demonstrating how the molecular-colloidal organizations can be exquisitely controlled by external fields.

Figure 4:
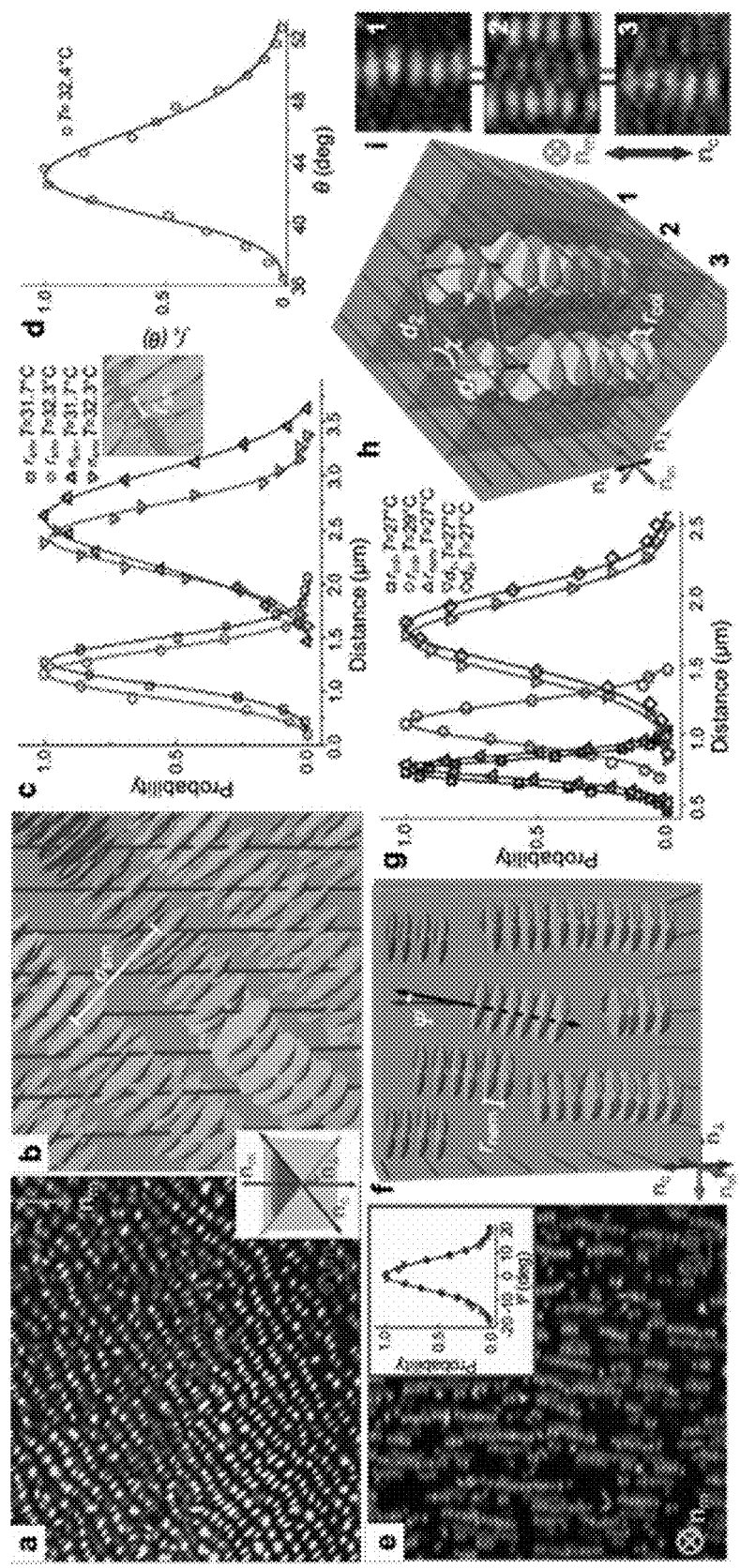

At Z*e<+50e, the electrostatic double layer torques are insufficiently strong to rotate discs away from $\omega_c \perp n_m$ with increasing temperature. The interplay of the weakened repulsive electrostatic and anisotropic elastic interactions favors column-like assemblies within 5CB (FIG. 2a, FIGS. 10g, j and 14a-c). The columns resemble molecular stacks of chromonic LCs, but are comprised of well-separated discs instead of molecular aggregates, arising from competing electrostatic and elastic interactions, as demonstrated for colloidal dimers in FIG. 1g, h. With increasing ρ, an orthorhombic $D_{2h}$ columnar nematic emerges, which exhibits a narrow distribution of columnar orientations with $n_c \perp n_m$ (FIG. 4e, f). At even higher ρ, a columnar order appears (FIGS. 4g-i and 10d and 14d-g), featuring a two-dimensional monoclinic (oblique) lattice of colloidal columns immersed within a molecular nematic host with $n_c \perp n_m$. This monoclinic columnar LC has a π-rotation symmetry axis of the oblique lattice along the columns and (orthogonal to it) a mirror symmetry plane containing the oblique primitive cell and discs. The inter-particle distance within columns $r_{col}$ and the inter-columnar distances $d_1 \neq d_2$ within the elementary cell, extracted from the 3D images, vary with temperature (FIG. 4g-i). The large-scale columnar order of discs (FIG. 4e-i and FIG. 14a-g) is quantified by orientational and positional distributions, which are relatively broad due to various dislocations and spatial variations of the monoclinic lattice parameters caused by effects of confinement, disc size polydispersity, et cetera. Upon increasing temperature, columnar lattices melt and the columns themselves eventually dissociate (FIG. 14). Depending on ρ, this leads to reversible transitions to uniaxial or orthorhombic nematics comprised of individual discs, before crossing over to isotropic or uniaxial colloidal nematic states at T≥34.7° C. (FIG. 2a).

The exemplary system's (composite condensed matter material) phase and ordering behaviors are captured by analytical modeling of key interactions at molecular and colloidal scales. Starting from Onsager-Parsons theory, suitably adapted to include higher-order electrostatics-enriched particle correlations along with surface boundary conditions and elastic forces, we scrutinize the phase behavior of discs in a molecular LC host. The emerging diagram distinctly features uniaxial, orthorhombic and monoclinic nematic phases at Z*e=+80e and the predicted order parameters agree with experiments (FIGS. 2a, e and 3i). A simple bifurcation analysis shows how the elastic interactions between discs drive a nematic-smectic transition within a central fraction of the temperature range of monoclinic order, when the quadrupolar elastic forces are strongly attractive for a colloidal center-to-center separation vector at ~45° relative to $n_m$, in agreement with experiments (FIG. 2a, e and FIG. 11b). Computer simulations of energy-minimizing $n_m$-distortions around discs at experimentally determined orientations and positions explain how oblique lattices of colloidal columns emerge from competing interactions despite the uniaxial disc symmetry (FIG. 4g-i, FIG. 14d-g). This anomalous columnar order arises when quadrupolar-like elastic interactions between discs balance the anisotropic electrostatic repulsions, with regions of locally distorted $n_m$ maximally overlapping while keeping like-charged disc surfaces apart.

Remarkably, the highly sought-after monoclinic nematic, smectic and columnar states all exist within a single system of two building blocks, both having a uniaxial symmetry. The emergent low-symmetry order arises from a thermal self-reconfiguration of relative orientations of the molecular and colloidal subsystems supplemented with competing anisotropic elastic, steric and electrostatic colloidal interactions. Our approach can be potentially extended to generate triclinic, chiral and polar mesophases by choosing different LC fluid hosts and colloidal particles with various shapes carrying magnetic or electrostatic dipoles. For example, colloidal particles with $C_{2h}$-symmetry could potentially form triclinic $C_{1h}$-nematics under conditions when the surface-interaction-controlled ordering axes of the particles are different from the nematic host's principal director. Such strategies could impart designable ferroelectric, ferromagnetic, piezoelectric and other properties on the ensuing materials, of interest for technological uses. Unlike in solids, where symmetries of the crystal basis are required to be compatible with the crystallographic lattices, no such constraints apply to nematic fluids that can, therefore, adopt a larger variety of symmetries yet to be discovered. The inventory of self-assembled colloidal crystals is still much smaller than that of their atomic counterparts abundantly found in nature, with the colloidal cubic diamond having been reported only recently. By contrast, our nematic colloids with shape- and size-dissimilar building blocks exhibit a wealth of fluid phases like monoclinic nematics, which exceeds what has been found in nature to date, and may inspire the quest of similar condensed matter states in molecular, polymeric, micellar and other systems.

To conclude, we have developed a soft matter system that exhibits orientational fluid order with the lowest monoclinic symmetry demonstrated so far, which emerges from the oblique mutual self-alignment of uniaxial colloidal and molecular building blocks at the mesoscale. Monoclinic order is unambiguously revealed through the direct imaging of discs that exhibit a skewed orientational distribution and by the oblique relative alignment of the molecular and colloidal directors. While many solid substances, like the common painkiller paracetamol, can inter-transform between monoclinic and orthorhombic states, our work demonstrates that the plurality of such low symmetries of orientational order can also be achieved in colloidal LC fluids. Low-symmetry nematic, smectic and columnar states of LC colloids can be used in applications ranging from displays to biodetectors and studies of nonabelian topological defects near orthorhombic-monoclinic nematic transitions.

Methods

Preparation of Colloidal Discs

Disc-shaped β-NaYF4:Yb/Er particles, designed to exhibit upconversion luminescence when excited at 980 nm, were synthesized following the hydrothermal synthesis method. Precursors and solvents used for the synthesis were of analytical grade and used without additional purifications. We purchased ytterbium nitrate hexahydrate (Yb(NO$_3$)$_3$ 6H$_2$O), yttrium nitrate hexahydrate (Y(NO$_3$)$_3$ 6H$_2$O), erbium nitrate pentahydrate (Er(NO$_3$)$_3$ 5H$_2$O), sodium fluoride and oxalic acid from Sigma Aldrich. Sodium hydroxide was purchased from Alfa Aesar. In a typical reaction, we dissolved 0.7 g of sodium hydroxide in 10 ml of deionized water, and then 5 ml of oxalic acid solution (2 g, 19.2 mmol) in deionized water was added to the solution at room temperature to obtain a clear transparent solution. Subsequently, 5 ml of sodium fluoride solution (202 mg, 4.8 mmol) was added to the mixture under vigorous stirring that continued for 15 min. Then, we injected 1.1 ml of Y(NO$_3$)$_3$ (0.88 mmol), 0.35 ml of Yb(NO$_3$)$_3$, and 0.05 ml of Er(NO$_3$)$_3$ into the above solution under vigorous stirring. After stirring for another 20 min at room temperature, the mixture was transferred to a 40 ml Teflon chamber (Col-Int. Tech.) and heated at 200° C. for 12 h. After the reaction, the mixture was allowed to cool down to room temperature naturally, and the particles (precipitated at the bottom of the reaction chamber) were collected by centrifugation, washed with deionized water multiple times, and finally dispersed in 10 ml of deionized water. The above synthesis method yields 10 nm-thick discs shown in FIG. 1a.

Surface Functionalization and Electrostatic Stabilization of Discs

We surface-functionalized the discs with a thin layer of silica and polyethylene glycol (FIG. 7b-e). For this, 1 ml of colloidal dispersion in deionized water was mixed with 5 ml of hydrogen peroxide ($H_2O_2$), and then 100 µl of nitric acid ($HNO_3$) was added dropwise into the solution and kept under vigorous mechanical agitation for 12 h. During this reaction, discs acquired positive surface charges, while oxalic acid molecules attached to particles' surfaces were oxidized. The positively charged discs were precipitated from the solution by centrifugation and dispersed in 1 ml of ethanol. We then coated the particles' surfaces with thin layers of silica. Briefly, 75 mg of polyvinyl pyrrolidone (molecular weight 40,000) was dissolved in 4 ml of ethanol and mixed with 1 ml of colloidal dispersion in ethanol. The solution was kept under continuous mechanical agitation for 24 h to ensure the adsorption of polyvinyl pyrrolidone on the colloidal surfaces. The particles were separated from the solution by centrifugation and redispersed in 5 ml of ethanol. Then, we added 200 µl of ammonia solution and 6 µl of tetraethyl orthosilicate (Sigma Aldrich) to the solution under vigorous mechanical agitation. After 12 h, the silica-coated discs were collected by centrifugation and washed with ethanol and deionized water and redispersed in 4 ml of ethanol. The solution pH was adjusted to 12 by adding ammonia solution (28% in water). Then, we dissolved 35 mg of silane terminated polyethylene glycol (molecular weight 5,000) in 1 ml of ethanol at 50° C. and mixed with the colloidal dispersions of the silica-capped particles and kept at 35° C. under continuous mechanical agitation. After 12 h, the surface-functionalized discs were collected by centrifugation, washed with ethanol and water, and finally dispersed in 1 ml of ethanol. Although the process of silica capping tends to reduce the positive charge on the particles, the effective surface charge on the discs remains positive for the silica thickness used in our experiments. The surface charges on as-prepared discs with a 5 nm silica layer were estimated to be in the range +(100-150)e, which reduced with time when stored in ethanol solvent. The surface charge of the discs below +100e was tuned by controlled aging of the particle dispersion in ethanol. The positive charge resides on the $NaYF_4$ core of the as-synthesized and surface-functionalized discs, with the silica capping effectively having a weak negative charge and used as a means to control the overall charge. The net positive charge of the discs with silica thickness ≤5 nm indicates that the charges of functionalized particles are dominated by their positively charged core.

Video Microscopy, Laser Trapping and Characterisation of Colloidal Charge

A charge-coupled device camera (Flea-COL, from Point Grey Research) mounted on upright BX-51 or inverted IX-71 microscopes (both from Olympus) was utilised for brightfield transmission-mode optical imaging and video microscopy. Olympus objectives with 10-100 times magnifications and numerical apertures within 0.2-1.4 were utilized in this imaging and video recording. The microscopes were additionally equipped with pairs of crossed linear polarizers and 530 nm phase retardation plates for the polarising optical microscopy experiments. A holographic laser tweezer system coupled to the optical microscopes was utilized to probe colloidal interactions between particles by bringing them close to each other and releasing from the laser traps.

The surface charge of the colloidal discs was characterized by probing their electrophoretic motions within 5CB when subjected to an external direct current (DC) electric field $E_{DC}$. LC cells for these measurements were prepared by sandwiching two polyvinyl alcohol coated glass plates with a spacing of about 30 µm, set using strips of aluminum foil, which also served as electrodes. The electrodes were connected to an external DC source (DS340, Stanford Research Systems) by copper wires. A dilute dispersion of discs in 5CB was infiltrated to the cell by means of capillary forces, and the dispersed particles were observed using an optical microscope (Olympus IX-81). A DC voltage of 5V was applied between the electrodes, and the particle displacement was video recorded (FIG. 7m). Disc velocities $v_D$ were obtained by measuring their displacements extracted from the video frames (with a measurement error of ±10 nm) in a selected time interval (FIG. 7n) using the image processing software ImageJ (version 1.52a, freeware from the National Institute of Health). The effective surface charge of the colloidal discs was estimated from the highly overdamped motion reflecting a balance of viscous drag and electrostatic forces acting on the discs, $\eta_f v_D = Z^* e E_{DC}$, where the DC electric field magnitude $E_{DC}$ was calculated using the inter-electrode distance and applied voltage. The frictional coefficient was determined as $\eta_f = k_B T / D_f$, where $k_B$ and $D_f$ are the Boltzmann's and diffusion constants, respectively. The diffusion constant $D_f$ of the particles was estimated based on the particle's Brownian motion within the same 5CB host by using the distribution of particle displacements recorded at a rate of 15 frames per second (FIG. 7o). Relative errors for measuring $\eta_f$, $Z^*e$ and $D_f$ were ±0.5%, ±1% and ±0.5%, respectively.

Nematic Colloidal Particle Dispersion and Self-Alignment

The polyethylene-glycol-functionalized discs were dispersed in 5CB (also known as pentyl cyanobiphenyl and 4-Cyano-4'-pentylbiphenyl, obtained from Frinton Labs), with a chemical structure shown in the inset of FIG. 7a. Briefly, 20 µl of disc dispersion in ethanol was mixed with 20 µl of 5CB, followed by solvent evaporation at 75° C. for 2 h and quenching to room temperature under vigorous mechanical agitation, yielding well-dispersed particles in the nematic host. The angle $\theta_e$ between $n_m$ and the disc normal $\omega_c$ varied within 0-90°, depending on temperature and the disc surface charge. At room temperature, discs with higher >+200e (lower <+100e) surface charge exhibited orientations with $\vartheta_e = 0°$ ($\vartheta_e = 90°$), whereas conical alignment was observed for moderate surface charges +(100-200)e. For +(50-100)e, $\theta_e$ varied with temperature (FIG. 1b and FIG. 7j) and ionic content of the LC host medium, consistent with the model described below. Aging colloidal dispersions of discs in as purchased 5CB by keeping it in an open bottle under ambient conditions for a few days to one week resulted in the absorption of ions from the atmosphere, allowing us to control the ionic content of the system. The Debye screening length estimated for such samples was in the range $\xi_D = 0.1-0.5$ µm, with the largest $\xi_D$ found in freshly prepared samples with as-purchased 5CB.

Imaging and Analysis of Particle Positions and Orientations

Optical imaging was performed using a multimodal 3D nonlinear imaging system built around a confocal system FV300 (from Olympus) and an inverted microscope (Olympus IX-81). We used a 100× objective with numerical aperture of 1.4 (Olympus UPlanFL) and a 980 nm pulsed output from a Ti:Sapphire oscillator (80 MHz, Coherent, Chameleon ultra) to optically excite our colloidal photon-upconverting discs. To achieve point-by-point scanning of the sample plane, the laser beam was sent through a set of Galvano mirrors, which control the lateral position of the scanning beam and define the imaging area. To enable depth-resolved 3D imaging, the objective was mounted on a stepper motor capable of re-positioning the focal plane across the sample depth with nanometer precision. Luminescence signals from the discs (FIG. 7f) were epi-collected by the same objective that was used for excitation; they were sent through a pinhole (confocal with the objective's focal plane) before being detected by a photomultiplier tube, with additional filters introduced to block the high-intensity excitation beam. An objective heater (from Bioptechs) mounted on the illumination objective was used to heat the sample for the temperature-dependent measurements, with a temperature control error less than ±0.1° C. Confocal photon-upconverting luminescence microscopy characterized orientations, positions, order parameters and number density $\rho$ of discs within different phases.

To directly characterize the spatial positions and orientations of discs, we used samples with different geometries of orientations of $n_m$ and $n_c$ relative to the microscope's optical axis and sample and imaging planes, much like specially-cut slabs with different orientations of crystallographic axes are used in studies of physical properties of solid crystals. Having $n_m$ and/or $n_c$ co-planar with the image planes was instrumental for the accurate characterization of the orientational order parameters. By using particles with different orientations immobilized on surfaces and at different depths of LC, we have determined the error of measuring polar and azimuthal angles of individual discs with ImageJ to be ±(1-2)° and spatial center of mass positions being ±(10-50) nm, both varying with the imaging depth (determined as widths of Gaussian fits to the respective angular and positional distributions). The relative error of estimating the number density $\rho$ based on counting discs within a volume of the 3D confocal images is 5%. While confocal microscopy is a standard technique in structural studies of colloidal crystals, glasses and LCs, our approach additionally takes advantage of the nonlinear photon-upconverting process that yields strong luminescence uniquely emitted by the discs, which was instrumental for resolving individual particles within the studied mesophases with the optical contrast being appropriate for the image analysis that we performed.

Three-photon excitation fluorescence polarising microscopy (3PEFPM) and corresponding spectral nonlinear optical fluorescence measurements were performed with the same microscope setup as described above, but using an 870 nm pulsed output from the tunable Ti:Sapphire oscillator for exciting the 5CB molecules through a three-photon absorption process. The emission from the sample was collected in epi-detection mode and characterized by a spectrometer (USB 2000, Ocean Optics). A half-wave plate was introduced before the objective to rotate the polarisation of the excitation beam. The absorption efficiency of the 5CB molecules and the ensuing fluorescence signal both depend strongly on $n_m$ orientations relative to the polarisation of the excitation beam (FIG. 7a). We measured a series of fluorescence spectra while rotating the linear excitation polarization direction with respect to $n_m$ (FIGS. 7a and 10l) for the 5CB samples with the in-plane $n_m$, confirming that the fluorescence intensity scales as $\cos^6\Omega_{3PEFPM}$, where $\Omega_{3PEFPM}$ is the angle between the polarisation of excitation light and $n_m$, whereas the intensity remains at a minimum in cells with a vertical $n_m$. Because the discs are very thin, the 3PEFPM images obtained by utilizing this fluorescence from 5CB in planar and homeotropic cells with discs at different concentrations up to ~1.5% by volume remain uniform throughout the samples, indicating that the thin discs only locally and very minimally perturb $n_m$ while retaining its far-field background away from disc surfaces. The 3PEFPM intensity variation measured for the biaxial hybrid LC with discs shows slightly different angular variation as compared to pure 5CB in the case of the in-plane $n_m$ (FIG. 10l), which is consistent with the nature of the orientational distribution of the molecules of the 5CB host fluid with embedded discs (FIGS. 1e-m, 3a, e). Since the 3PEFPM signal originates directly from 5CB molecules, this indicates that the interaction of the molecular rods with the aligned colloidal discs induces a weakly biaxial distribution of molecular orientations at the disc edges as well, consistent with our numerical modeling (FIG. 8).

Both upconversion-based confocal images of discs and 3PEFPM images of $n_m$-perturbations due to disc presence are qualitatively similar when obtained at different sample depths of monodomain uniaxial, biaxial and monoclinic colloidal nematics. Unless specified differently, we provide them for sample depths within 10-100 µm away from the confining surface closest to the imaging objective. The principal advantage of such 3D depth-resolved imaging of nematic colloids with translational invariance of the nematic phase symmetries is that it provides the ability to quantify orientational order through direct imaging of individual disc orientations and positions (used to determine order parameters and orientational distributions), which is impossible to achieve with conventional fluorescence, brightfield or other microscopy techniques that lack the 3D resolution capability. Differently, our 3D depth-resolved imaging of colloidal structures with positional ordering allows us to determine key characteristics, such as lattice parameters, in addition to probing orientational order of discs and LC molecules. Examples of such 3D images and reconstructed colloidal organizations based on them are provided in FIG. 4h-i and in FIG. 14d-g.

LC Sample Preparation and Phase Diagram

Dispersions of colloidal discs were infiltrated into glass cells with 10-100 µm gap thickness or rectangular capillaries (obtained from VitroCom) with 0.2×2.0 mm or 0.5×5.0 mm cross-sections using capillary forces. The gap thickness within the glass cell was set using Mylar films. Additionally, colloidal disc dispersions were filled into 2×2×3 mm containers obtained by 3D printing (using a Lulzbot Taz 3D printer, purchased from Lulzbot) it atop a glass coverslip with a desired alignment layer for $n_m$. For the particular studied ranges of $\rho$ and T, no difference in phase behavior was observed for samples of thickness ≥10 µm regardless of these different types of confinement and sample preparation. Unless specified differently, results in this work are presented for glass cells with 100 µm gap between confining substrates. To obtain monodomain samples with perpendicular boundary conditions for $n_m$, the inner surfaces of cells, containers and capillaries were treated with surfactant dimethyloctadecyl[3-(trimethoxysilyl)propyl]ammonium chloride (obtained from Acros Organics). To achieve unidirectional planar surface boundary conditions for $n_m$, the top and bottom substrates were coated with 1 wt. % aqueous polyvinyl alcohol (Sigma Aldrich) and rubbed to define the direction of $n_m$. No surface treatment was used to control boundary conditions for $n_c$, so that we observed orthorhombic and monoclinic nematics with spontaneously monodomain and sometimes polydomain $n_c$ orientations within the studied fields of view. The phase diagram (FIG. 2a) was obtained by preparing a series of samples with different colloidal disc charge and number density and then changing temperature with a step of 0.1° C. while probing the colloidal behavior after about 30 min of thermal equilibration at each temperature. Fast changes of temperature did not provide sufficient time for thermal equilibration and often caused hysteresis of the colloidal behaviour, as well as its spatial variation due to thermal gradients. This could enable spatial patterning of LC colloidal order.

Figure 5:
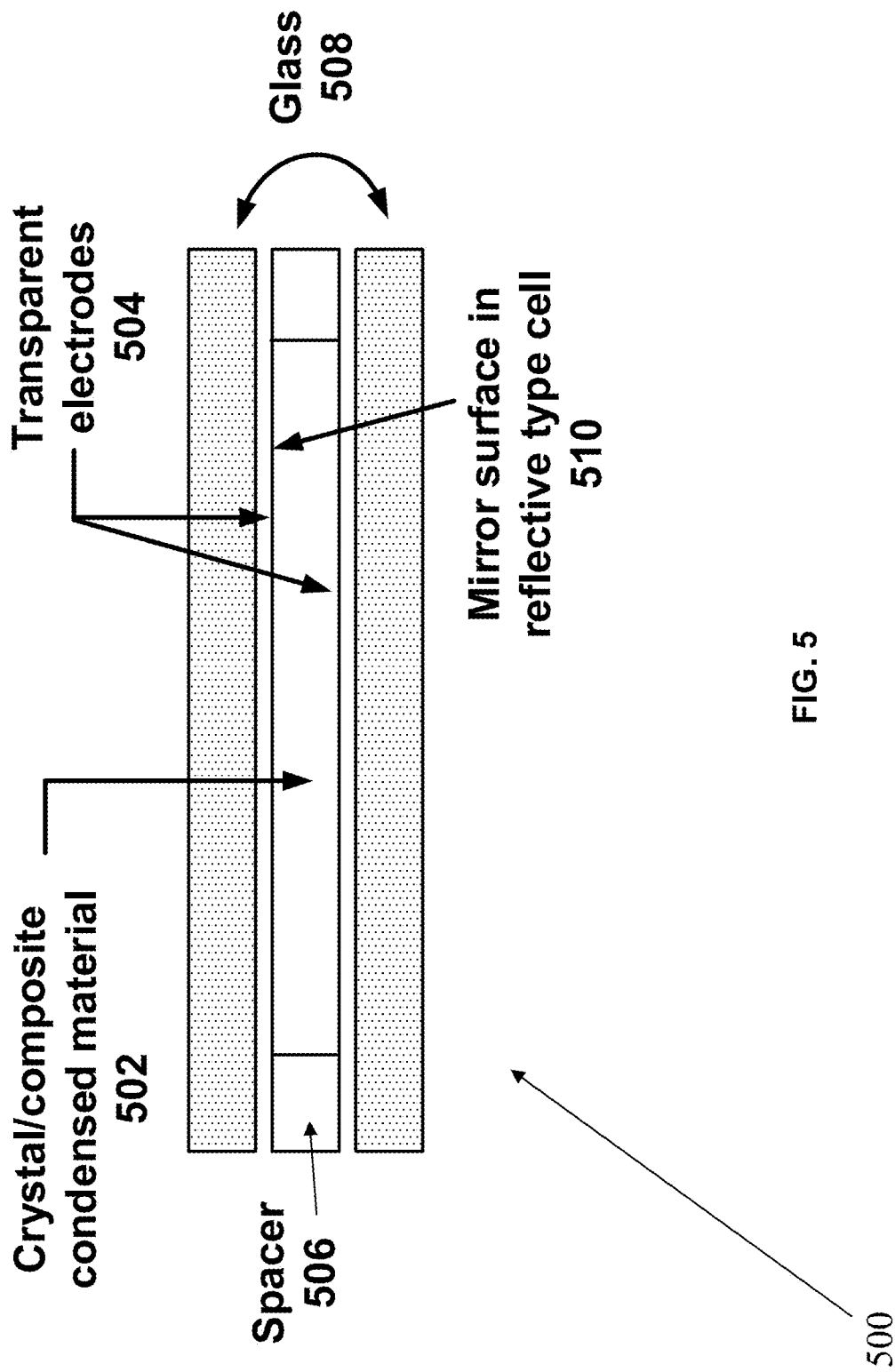
FIG. 5 illustrates a display in accordance with examples of the disclosure.

FIG. 5 illustrates an exemplary device 500, such as a display device. Device 500 includes composite condensed matter material 502, such as composite condensed material described herein. In the illustrated example, device 500 also includes transparent electrodes 504, one or more spacers 506, glass plates 508, and optionally mirror surfaces 510.

Figure 6:
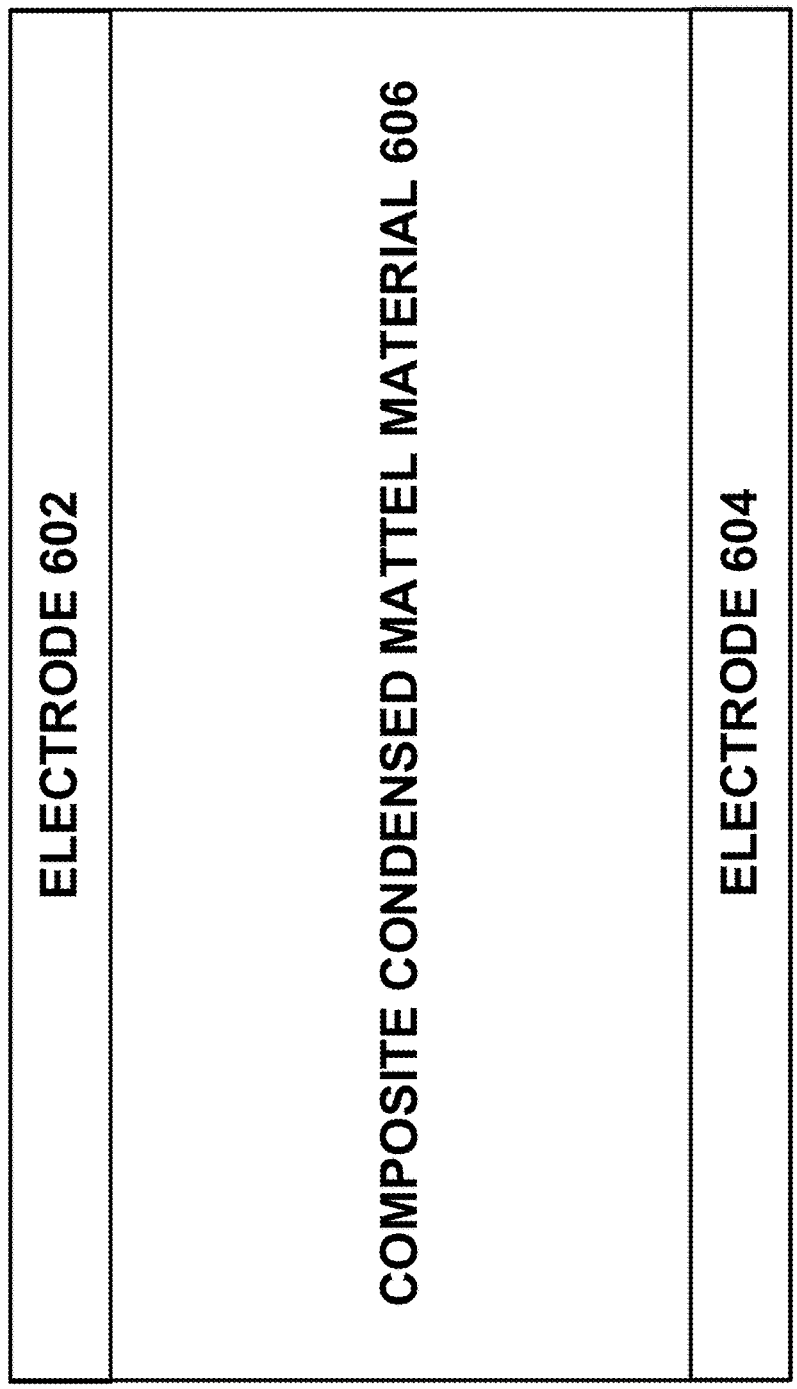
FIG. 6 illustrates a device suitable for use as a sensor and/or biodetector in accordance with examples of the disclosure.

FIG. 6 illustrates another device 600 in accordance with examples of the disclosure. Device 600 includes electrodes 602, 604, which can be formed of any suitable conductive material, and composite condensed matter material 602, such as composite condensed material described herein.

The example embodiments of the disclosure described above do not limit the scope of the invention, since these embodiments are merely examples of the embodiments of the invention. Any equivalent embodiments are intended to be within the scope of this invention. Indeed, various modifications of the disclosure, in addition to the embodiments shown and described herein, such as alternative useful combinations of the elements described, may become apparent to those skilled in the art from the description. Such modifications and embodiments are also intended to fall within the scope of the appended claims.

We claim:

1. A composite condensed matter material comprising:
   a liquid crystal host material comprising molecules having a first shape; and
   particles dispersed and suspended within the host material, the particles having a second shape, the second shape being the same or different from the first shape;
   wherein the particles comprise one or more of semiconductor material, dielectric material, magnetic material, or any combination thereof,
   wherein the particles are surface functionalized with one or more of silica or polyethylene glycol and/or treated with an acid treatment to mitigate aggregation of the particles and to facilitate orientation of the particles different from the orientation of the molecules,
   wherein the composite condensed matter material exhibits one or more low symmetry phases, and
   wherein the composite condensed matter material exhibits reconfigurable properties.

2. The composite condensed matter material of claim 1, wherein the host material comprises nematic liquid crystal material.

3. The composite condensed matter material of claim 1, wherein the particles are disc-shaped and comprises a positive core and a coating that comprise a negative charge.

4. The composite condensed matter material of claim 1, wherein a size of the particles ranges from about 2 nm to about 10 μm.

5. The composite condensed matter material of claim 1, wherein the particles exhibit different orientation from that of the molecules.

6. The composite condensed matter material of claim 1, wherein the particles comprise a silica coating.

7. The composite condensed matter material of claim 1, wherein the composite condensed matter material exhibits one or more of monoclinic, orthorhombic, triclinic biaxial orientational order, or orientational order with any other symmetry different from that of shapes and phases formed by molecules and particles.

8. The composite condensed matter material of claim 1, wherein the particles comprise a shape selected from the group consisting of hexagonal prism, disc, v-shape, u-shape, w-shape, and triangular prism.

9. The composite condensed matter material of claim 1, wherein the particles are coated with a polymer to stabilize the particles by steric interaction.

10. The composite condensed matter material of claim 1, wherein both the host material and the particles exhibit uniaxial symmetry and wherein the low-symmetry condensed material exhibits nematic, smectic, and columnar states with monoclinic, triclinic, orthorhombic and other symmetries of orientational order that have a lower number of symmetry operations compared to the uniaxial symmetry.

11. The composite condensed matter material of claim 1, wherein the properties of phases combine fluidity with orientational order and no or varying degrees of positional order, as well as are selected from the group consisting of ferroelectric, ferromagnetic, piezoelectric, and dielectric.

12. The composite condensed matter material of claim 1, wherein the composite condensed matter material exhibits a plurality of phases.

13. The composite condensed matter material of claim 1, wherein the host material comprises one or more molecular mesogens.

14. The composite condensed matter material of claim 13, wherein the one or more molecular mesogens comprise 4-cyano-4'-pentylbiphenyl.

15. A method of using the composite condensed matter material of claim 1 comprising applying one of more of heat, light, mechanical stress, electric or magnetic field, and bias to the composite condensed matter material to change an orientation of the composite condensed matter material.

16. The method of claim 15, wherein the composite condensed matter material becomes more ordered upon application of one of more of heat, electric or magnetic field, and bias to the composite condensed matter material.

17. A device comprising the composite condensed matter material of claim 1.

18. A method of forming the composite condensed matter material of claim 1, the method comprising the steps of:
   forming particles;
   providing a nematic host material; and
   dispersing the particles within the host material to form a colloidal dispersion within the nematic host material.

19. The composite condensed matter material of claim 2, wherein the particles are coated with a polymer to stabilize the particles by steric interaction.

20. The composite condensed matter material of claim 19, wherein the polymer comprises polyethylene glycol or polystyrene.

* * * * *